United States Patent
Nomura et al.

(10) Patent No.: US 7,453,786 B2
(45) Date of Patent: Nov. 18, 2008

(54) OPTICAL PICKUP APPARATUS, OBJECTIVE OPTICAL ELEMENT AND OPTICAL INFORMATION RECORDING AND/OR REPRODUCING APPARATUS

(75) Inventors: Eiji Nomura, Hachioji (JP); Kentarou Nakamura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/822,981

(22) Filed: Jul. 11, 2007

(65) Prior Publication Data
US 2008/0013412 A1 Jan. 17, 2008

(30) Foreign Application Priority Data
Jul. 14, 2006 (JP) .............................. 2006-193769
Oct. 19, 2006 (JP) .............................. 2006-285298

(51) Int. Cl.
*G11B 7/00* (2006.01)
(52) U.S. Cl. ................................. 369/112.13
(58) Field of Classification Search ........................ None
See application file for complete search history.

(56) References Cited

U.S. PATENT DOCUMENTS 6,191,889 B1 * 2/2001 Maruyama .................. 359/566
6,366,542 B1 * 4/2002 Kojima et al. ............ 369/44.23
6,515,955 B2 * 2/2003 Takeuchi ................ 369/112.08
6,665,130 B2 * 12/2003 Kimura ...................... 359/719
6,728,042 B2 * 4/2004 Ota et al. .................... 359/637
7,050,236 B2 * 5/2006 Ikenaka ....................... 359/569

FOREIGN PATENT DOCUMENTS

EP 1 304 689 A2 4/2003

* cited by examiner

*Primary Examiner*—Joseph Feild
*Assistant Examiner*—Peter Vincent Agustin
(74) *Attorney, Agent, or Firm*—Finnegan, Henderson, Farabow, Garrett & Dunner, L.L.P.

(57) ABSTRACT

An optical pickup apparatus comprises: a first light source; a second light source; a third light source; and an objective optical element. The objective optical element comprises at least two areas comprising first and second optical path difference providing structures. A third light flux from the third light source passing the first optical path difference providing structure forms first and second best focuses. The third light flux passing the objective optical element forms a spot comprising a central spot portion; an intermediate spot portion; and a peripheral spot portion. The central spot portion is used for recording and/or reproducing information for a third optical disk, and the intermediate and peripheral spot portions are not used for recording and/or reproducing information for the third optical disk. The peripheral spot portion is formed on the third optical disk by the third light flux through the second optical path difference providing structure.

35 Claims, 7 Drawing Sheets

FIG. 1
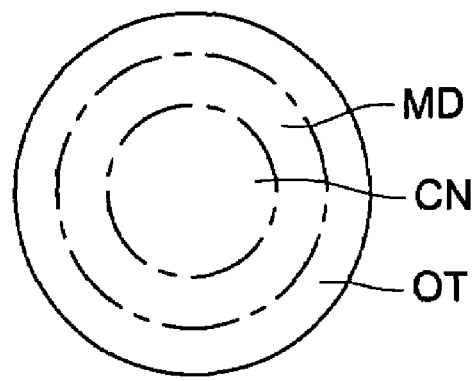
FIG. 2(a)    FIG. 2(b)
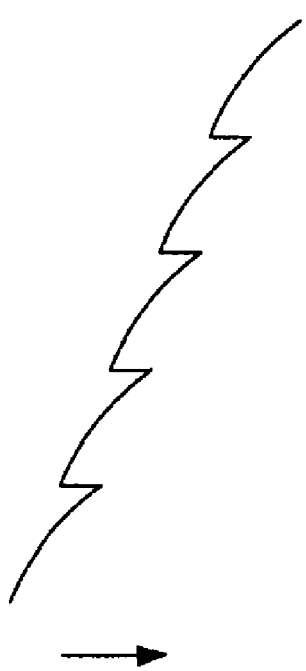
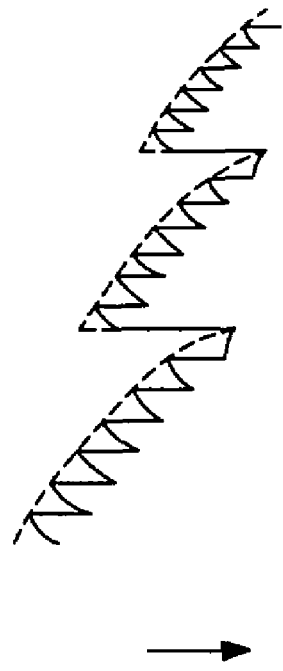

OPTICAL PICKUP APPARATUS, OBJECTIVE OPTICAL ELEMENT AND OPTICAL INFORMATION RECORDING AND/OR REPRODUCING APPARATUS

This application is based on Japanese Patent Application Nos. 2006-193769 filed on Jul. 14, 2006, and 2006-285298 filed on Oct. 19, 2006 in Japanese Patent Office, the entire content of which is hereby incorporated by reference.

BACKGROUND OF THE INVENTION

The present invention relates to an optical pickup apparatus, objective optical element and optical information recording reproducing apparatus by which information can be recorded and/or reproduced information compatibly for different kinds of optical disks.

In recent years, tendency of a shorter wavelength of laser beam as a light source which has been used to record and/or reproduce information for optical disks, has become a main stream. For example, a laser light source having 400-420 nm wavelength, such as a blue-violet semiconductor laser; and a blue-SHG laser which converts wavelength of an infrared semiconductor laser utilizing a second harmonic wave, have been made practical. Information of 15-20 GB can be recorded on the optical disk having a diameter of 12 cm by using these blue-violet optical sources and an objective lens having NA (Numerical aperture) which is the same as a DVD (Digital Versatile Disc). When NA is increased to 0.85, information of 23-25 GB can be recorded onto the optical disk having a diameter of 12 cm. In this specification, the optical disk and an optical-magnetic disk using a blue-violet laser light source are called "a high density optical disk".

Hereupon, the high density optical disk using the objective optical element, has larger coma caused due to the skew of the optical disk. Therefore some high density optical disks using the objective optical element with NA of 0.85, are designed so that the protective layer has thinner thickness (which is 0.1 mm, while that of DVD is 0.6 mm) than that of DVD to reduce the comma due to the skew. On the other hand, it is sometimes considered that a product, such as an optical disk player/recorder, which is capable of only recording/reproducing information for the above high-density optical disk is worthless. Taking account of a fact that, at present, DVDs and CDs (Compact Disc), onto which various kinds of information have been recorded, are on the market, the value of the product as a high-density optical disk player/recorder is increased by, for example, enabling to appropriately record/reproduce information additionally for DVDs and CDs, which a user possesses. From these backgrounds, the optical pickup apparatus installed in the high-density optical disk player/recorder is required to be capable of appropriately recording/reproducing information not only for a high-density optical disk but also a DVD and a CD.

It can be considered, as a method by which the information can be adequately recorded/reproduced while the compatibility is maintained also to anyone of the high density optical disk and DVD and further to CD, a method to selectively switch the optical system for the high density optical disk and the optical system for DVD and CD corresponding to the recording density of the optical disk to which the information is recorded/reproduced. However, it requires a plurality of optical systems, which is disadvantageous for the size-reduction and which increases the cost.

Accordingly, in order to simplify the structure of the optical pickup apparatus and to intend the reduction of cost, it is preferable to make an optical system for the high density optical disk an optical system for DVD and CD into a common optical system, and to reduce the number of optical parts contributing the optical pickup apparatus as much as possible, even when the optical pickup apparatus has compatibility. Then, providing the common objective optical element which is arranged with facing an optical disk, is most advantageous for the simplification of the construction or cost reduction of the optical pickup apparatus. Here, in order to obtain the common objective optical element for plural kinds of optical disks which use different wavelengths for recording/reproducing information, it is required that the objective optical system is provided with an optical path difference providing structure having a wavelength dependency for the spherical aberration, which is formed thereon.

European patent application EP-A 1304689 discloses an objective optical system which has the diffractive structure as an optical path difference providing structure and can be commonly used for the high density optical disk and the conventional DVD and CD, and also discloses an optical pickup apparatus in which this objective optical system is mounted.

However, the objective optical element for use in the optical pickup apparatus which compatibly conducts recording and/or reproducing information for three different optical disks, which is written in EP-A 1304689, has a probability that the light amount used for recording and/or reproducing information is insufficient, and that proper flare is hardly generated when information is recorded and/or reproduced for CD or DVD, depending on the design specification of the optical pickup apparatus, which are problems.

SUMMARY OF THE INVENTION

The present invention has been attained in view of the aforesaid problems, and at least one of the following objects can be achieved by the invention. First, one of the objects is to provide an optical pickup apparatus, an objective optical element and an optical information recording and/or reproducing apparatus which enable to generate proper flare for recording and/or reproducing information for CD and DVD even if a single lens is used as an objective optical element, and which can properly record and/or reproduce information for three different types in terms of recording density such as a high density optical disk, DVD and CD. Another of the objects is to provide an optical pickup apparatus, an objective optical element and an optical information recording and/or reproducing apparatus wherein simplification of the structure and cost reduction can be realized. In addition, another of the objects is to provide an optical pickup apparatus, an objective optical element and an optical information recording and/or reproducing apparatus wherein light utilization efficiency can be enhanced and sufficient light amount can be assured for all of three different types of optical disks.

According to various embodiments, the present teachings can provide an optical pickup apparatus for recording and/or reproducing information for an optical disk. The optical pickup apparatus can comprise: a first light source for emitting a first light flux having a first wavelength $\lambda 1$; a second light source for emitting a second light flux having a second wavelength $\lambda 2$ ($\lambda 2 > \lambda 1$); a third light source for emitting a third light flux having a third wavelength $\lambda 3$ ($\lambda 3 > \lambda 2$); and an objective optical element. The objective optical element is provided for converging the first light flux onto an information recording surface of a first optical disk having a protective substrate with a thickness t1, for converging the second light flux onto an information recording surface of a second optical disk having a protective substrate with a thickness t2

(t1≦t2), and for converging the third light flux onto an information recording surface of a third optical disk having a protective substrate with a thickness t3 (t2<t3). The optical pickup apparatus can record and/or reproduce information by converging the first light flux onto the information recording surface of the first optical disk, by converging the second light flux onto the information recording surface of the second optical disk, and by converging the third light flux onto the information recording surface of the third optical disk. The objective optical element can comprise an optical surface comprising a central area and a peripheral area surrounding the central area. The central area can comprise a first optical path difference providing structure, and the peripheral area can comprise a second optical path difference providing structure. The objective optical element can converge the first light flux which passes through the central area of the objective optical element onto the information recording surface of the first optical disk so that the optical pickup apparatus can record and/or reproduce information on the information recording surface of the first optical disk. The objective optical element also can converge the second light flux which passes through the central area of the objective optical element onto the information recording surface of the second optical disk so that the optical pickup apparatus can record and/or reproduce information on the information recording surface of the second optical disk. The objective optical element further can converge the third light flux which passes through the central area of the objective optical element onto the information recording surface of the third optical disk so that the optical pickup apparatus can record and/or reproduce information on the information recording surface of the third optical disk. The objective optical element can converge the first light flux which passes through the peripheral area of the objective optical element onto the information recording surface of the first optical disk so that the optical pickup apparatus can record and/or reproduce information on the information recording surface of the first optical disk. The objective optical element also can converge the second light flux which passes through the peripheral area of the objective optical element onto the information recording surface of the second optical disk so that the optical pickup apparatus can record and/or reproduce information on the information recording surface of the second optical disk. In the optical pickup apparatus, the third light flux which passes through the first optical path difference providing structure can form a first best focus in which the third light flux forms a spot having a smallest diameter, and the third light flux which passes through the first optical path difference providing structure can form a second best focus in which the third light flux forms a spot having a second smallest diameter. The first best focus and the second best focus can satisfy the following expression:

$$0 < L/f < 0.05,$$

where f (mm) is a focal length of the objective optical element for the third light flux which passes through the first optical path difference structure and forms the first best focus, and L (mm) is a distance between the first best focus and the second best focus. In the optical pickup apparatus, the third light flux which passes through the objective optical element can form a spot on the information recording surface of the third optical disk, and the spot can comprise, in order from a center to an outside of the spot when viewing the spot from a direction of an optical axis of the objective optical element: a central spot portion having a highest light density; an intermediate spot portion having a lower light density than the central spot portion; and a peripheral spot portion having a higher light density than the intermediate spot portion and having a lower light density than the central spot portion. The central spot portion can be used for recording and/or reproducing information for the third optical disk, the intermediate spot portion and the peripheral spot portion can not be used for recording and/or reproducing information for the third optical disk. The peripheral spot portion can be formed on the information recording surface of the third optical disk by the third light flux which passes through the second optical path difference providing structure of the objective optical element.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIG. 1 is a diagram in which an example of objective optical element OL relating to the present invention is viewed in the optical axis direction;

FIG. 2 is a cross-sectional view showing schematically some examples of an optical path difference providing structure provided on objective optical element OL;

DETAILED DESCRIPTION OF THE PREFERRED EMBODIMENT

Figure 3:
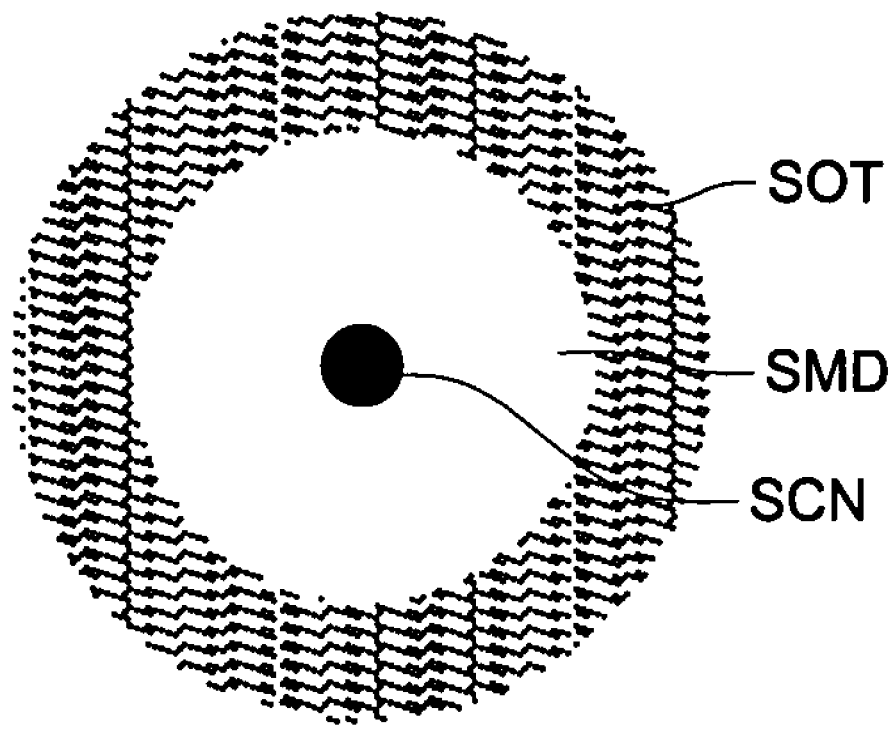
FIG. 3 is a diagram showing a form of a spot relating to the present invention.

An optical pickup apparatus according to the present invention comprises at least three light sources: a first light source, a second light source, and a third light source. The optical pickup apparatus further comprises a light converging optical system for converging the first light flux on the information recording surface of the first optical disk, converging the second light flux on the information recording surface of the second optical disk, and converging the third light flux on the information recording surface of the third optical disk. The optical pickup apparatus according to the present invention further comprises a light receiving element for receiving each of reflected light fluxes from the information recording surface of the first optical disk, the second optical disk, and the third optical disk.

The first optical disk comprises a protective substrate with a thickness of t1 and an information recording surface. The second optical disk comprises a protective substrate with a thickness of t2 (t1≦t2) and an information recording surface. The third optical disk comprises a protective substrate of a thickness of t3 (t2<t3) and an information recording surface. It is preferable that the first optical disk is a high density optical disk, the second optical disk is DVD, and the third optical disk is CD, however, optical disks are not limited to those. Further, in the case where t1<t2, as compared to the case where t1=t2, it is more difficult to record and/or reproduce information for three different optical disks by an objective optical element being a single lens, with providing excellent tracking characteristics at the time of recording and/or reproducing information for the third optical disk. However, an embodiment according to the present invention can conduct that. Hereupon, the first optical disk, the second optical disk or the third optical disk may also be an optical disk of the plurality of layers having the plurality of the information recording surfaces.

As an example of the high density optical disk in the present specification, there is cited an optical disk (for example, BD: Blu-ray Disc) based on the standard that information is recorded and/or reproduced by an objective optical element with NA 0.85, and that a protective substrate of the optical disk is about 0.1 mm. Further, as an example of another high density optical disk, there is cited an optical disk (for example, HD DVD: it also called HD) based on the standard that information is recorded and/or reproduced by an objective optical element with NA in the range of 0.65 to 0.67 and the protective substrate of the optical disk is about 0.6 mm. Further, the high density optical disk includes an optical disk having a protective film (in the present specification, the protective substrate includes also the protective film), having a thickness of about several to several ten nm on the information recording surface, or an optical disk whose protective substrate thickness is 0 (zero). The high density optical disk further includes a photo-magnetic disk for which the blue-violet semiconductor laser or blue-violet SHG laser is used as the light source for recording/reproducing information. Further, DVD in the present specification represents a generic name of optical disks based on the standard that information is recorded and/or reproduced by an objective optical element with NA in the range of 0.60 to 0.67 and that the protective substrate of the optical disk is about 0.6 mm, which belong to DVD group such as DVD-ROM, DVD-Video, DVD-Audio, DVD-RAM, DVD-R, DVD-RW, DVD+R and DVD+RW. In the present specification, CD represents a generic name of optical disks based on the standard that information is recorded and/or reproduced by an objective optical element with NA in the range of 0.45 to 0.53 and that the protective substrate of the optical disk is about 1.2 mm, which belong to CD group such as CD-ROM, CD-Audio, CD-Video, CD-R and CD-RW. Among these optical disks, the high density optical disk provides the highest recording density. DVD and CD provide the second highest recording density, the third highest recording density, respectively.

Thicknesses t1, t2, and t3 of the protective substrates preferably satisfy the following conditional expressions (11), (12), and (13). However, it is to be understood that various changes and modifications will be apparent to those skilled in the art.

$$0.0750 \text{ mm} \leq t1 \leq 0.125 \text{ mm or } 0.5 \text{ mm} \leq t1 \leq 0.7 \text{ mm} \quad (11)$$

$$0.5 \text{ mm} \leq t2 \leq 0.7 \text{ mm} \quad (12)$$

$$1.0 \text{ mm} \leq t3 \leq 1.3 \text{ mm} \quad (13)$$

In the present specification, each of the first light source, the second light source, and the third light source is preferably a laser light source. A semiconductor laser, and a silicon laser are preferably used for the laser light source. The first wavelength $\lambda 1$ of the first light flux emitted from the first light source, the second wavelength $\lambda 2$ ($\lambda 2 > \lambda 1$) of the second light flux emitted from the second light source, the third wavelength $\lambda 3$ ($\lambda 3 > \lambda 2$) of the third light flux emitted from the third light source, are preferable to satisfy the following conditional expressions (9) and (10).

$$1.5 \times \lambda 1 < \lambda 2 < 1.7 \times \lambda 1 \quad (9)$$

$$1.9 \times \lambda 1 < \lambda 3 < 2.1 \times \lambda 1 \quad (10)$$

When BD or HD is employed as the first optical disk, the wavelength $\lambda 1$ of the first light source is preferably 350 nm or more, and 440 nm or less. The wavelength $\lambda 1$ is more preferably 380 nm or more, and 415 nm or less. When DVD is employed as the second optical disk, the second wavelength $\lambda 2$ of the second light source is preferably 570 nm or more, and 680 nm or less. The second wavelength $\lambda 2$ is more preferably 630 nm or more, and 670 nm or less. When CD is employed for the third optical disk, the third wavelength $\lambda 3$ of the third light source is preferably 750 nm or more, and 880 nm or less. The third wavelength $\lambda 3$ is more preferably 760 nm or more, and 820 nm or less.

Further, at least two light sources of the first light source, the second light source, and the third light source may also be unitized. The unitization means fixing and housing. For example, the first light source and the second light source can be into one package. However it is to be understood that various changes and modifications will be apparent to those skilled in the art. The unitization in a broad sense includes a situation that two light sources are fixed so that aberration can not be corrected. Further, in addition to the light source, the light receiving element which will be described later, may also be provided as one package.

As the light receiving element, the photodetector such as a photo diode is preferably used. The light reflected on the information recording surface of the optical disk enters into the light receiving element, and signal outputted from the light receiving element is used for obtaining the read signal of the information recorded in each optical disk. Further, the light amount of the spot on the light receiving element caused with the change in the spot shape and the change in the spot position, to conduct the focus detection and the tracking detection focus detection. The objective optical element is moved based on these detections for focusing and tracking of the objective optical element. The light receiving element may be composed of a plurality of photodetectors. The light receiving element may also have a main photodetector and secondary photodetector. For example, the light receiving element is provided with a main photodetector which receives the main light used for recording and/or reproducing information, and two secondary photodetectors positioned on both sides of the main photodetector, so as to receive secondary light for tracking adjustment by the two secondary photodetectors. Further, the light receiving element may also comprise a plurality of light receiving elements corresponding to each light source.

The light converging optical system comprises the objective optical element. The light converging optical system may comprise only an objective optical element. Alternatively, the light converging optical system may further comprise a coupling lens such as a collimator lens other than the objective optical element. The coupling lens means a single lens or a lens group which is arranged between the objective optical element and the light source and which changes divergent angle of a light flux. The collimator lens is a kind of coupling lens and is a lens receiving an incident light flux and emitting it as a parallel light flux. Further, the light converging optical system may also comprise an optical element such as the diffractive optical element which divides the light flux emitted from the light source into a main light flux used for recording reproducing information and two secondary light fluxes used for the tracking operation and so on. In the present specification, the objective optical element means an optical system which is arranged to face the optical disk in the optical pickup apparatus, which has the function which converges the light flux emitted from the light source onto an information recording surface of the optical disk. Preferably, the objective optical element is an optical system which is arranged to face the optical disk in the optical pickup apparatus, and which has the function which converges the light flux emitted from the light source on the information recording surface of the optical disk, and further which is movable as one body in the direction of at least the optical axis by an actuator. The objective optical element may be formed of a plurality of lenses and/or optical elements. Alternatively, the objective optical element may be a single lens. Preferably, the objective lens is formed of a single lens. The objective optical element may also be a glass lens, a plastic lens or a hybrid lens in which an optical path difference providing structure is formed on the glass lens by using photo-curing resin. When the objective optical element has a plurality of lenses, a combination of a glass lens and a plastic lens can be used for the objective optical element. When the objective optical element has a plurality of lenses and/or optical elements, there may be provided a combination of an optical element in flat plate shape having an optical path difference providing structure and an aspheric surface lens which has a optical path difference providing structure or does not have the optical path difference providing structure. The objective optical element preferably comprises a refractive surface which is an aspheric surface. Further, the objective optical element preferably can have a base surface where the optical path difference providing structure is provided, which is an aspheric surface.

Further, when the objective optical element is a glass lens, a glass material used for the glass lens preferably has a glass transition point Tg of 400° C. or less. By using the glass material whose glass transition point Tg is 400° C. or less, the material can be molded at a comparatively low temperature. Therefore, the life of the metallic mold can be prolonged. As an example of the glass material whose glass transition point Tg is low, there are K-PG325 and K-PG375 (both are trade names) made by SUMITA Optical glass, Inc.

Hereupon, a glass lens has generally larger specific gravity than a resin lens. Therefore, the objective optical element made of a glass lens has larger weight and applies a larger burden to the actuator which drives the objective optical element. Therefore, when a glass lens is employed for the objective optical lens, a glass material having small specific gravity is preferably used for the objective optical element. Specifically, the specific gravity is preferably 3.0 or less, and is more preferably 2.8 or less.

Further, when a plastic lens is employed for the objective optical element, it is preferable that the resin material of cyclic olefins is used for the objective optical element. In the cyclic olefins, there is more preferably used the resin material having: refractive index at the temperature 25° C. for wavelength 405 nm, which is within the range of 1.54 to 1.60; and ratio of refractive index change dN/dT (° C.$^{-1}$) with the temperature change within the temperature range of −5° C. to 70° C. for the wavelength 405 nm, which is within the range of $-20 \times 10^{-5}$ to $-5 \times 10^{-5}$ (more preferably, $-10 \times 10^{-5}$ to $-8 \times 10^{-5}$). Further, when a plastic lens is employed for the objective optical element, it is preferable that a plastic lens is also employed for the coupling lens.

Alternatively, as the resin material appropriate to the objective optical element of the present invention, there is "athermal resin" also other than the cyclic olefins. "Athermal resin" is a resin material in which microparticles each having a diameter of 30 nm or less are dispersed into a resin which is a base material. The material of the microparticles has ratio of change in the refractive index with the temperature change, and the ratio of change in the refractive index of the microparticles has the opposite sign to that of the material of the resin which is the base material. Generally, when microparticles are mixed in the transparent resin material, light is scattered and the transmission factor is lowered. So, it is difficult to use as the optical material. However, it becomes clear that the microparticles whose size is smaller than the wavelength of the transmitting light flux prevent the scattering effectively.

Hereupon, the refractive index of the resin material is lowered when the temperature rises, while the refractive index of the inorganic microparticles is increased when the temperature rises. Accordingly, it is also well known to prevent the refractive index from changing by combining above nature of the microparticles and the base material so as to cancel them out each other. When the objective optical element according to the present invention employs the material such that the inorganic particles whose size is 30 nanometer or less, which is preferably 20 nanometer or less, more preferably 10 - 15 nanometers, are dispersed in the resin as base material, there can be provided the objective optical unit having no or very low temperature dependency of the refractive index.

For example, microparticles of niobium oxide ($Nb_2O_5$) are dispersed in acryl resin. The volume ratio of the resin material that represents the basic material is about 80% and that of niobium oxide is about 20%, and these are mixed uniformly. Though microparticles have a problem that they tend to condense, the necessary state of dispersion can be kept by a technology to disperse particles by giving electric charges to the surface of each particle.

It is preferable that microparticles are mixed and dispersed into the resin as a base material during injection molding of optical elements by the in-line manner. In other words, it is preferable that, after the microparticles are mixed and dispersed in to the base material, the mixture is neither cooled nor solidified until the mixture is molded into an objective optical unit.

Incidentally, in order to control the ratio of change in the refractive index with the temperature, the volume ratio of microparticles to the base material may increase or decrease, and microparticles in which a plural kinds of nanometer-sized microparticles are blended may also be dispersed into the base material.

Though the volume ratio of the microparticles and the base material is made to be 80:20, namely to be 4:1, in the example stated above, it is possible to adjust properly within a range from 90:10 (9:1) to 60:40 (3:2). It is preferable that a volume of the microparticles is provided to be exceed the ratio of 9:1, because the temperature-affected change is effectively reduced. While, it is also preferable that a volume of the microparticles is provided to be less than the ratio of 3:2, because moldability of the athermal resin becomes easy.

It is preferable that the microparticles are inorganic substances, and more preferable that the microparticles are oxides. Further, it is preferable that the state of oxidation is saturated, and the oxides are not oxidized any more.

It is preferable that the microparticles are inorganic substances because reaction between the inorganic substances and resin as a base material representing high molecular organic compound is restrained to be low, and deterioration caused by actual use such as irradiation of laser beam can be prevented because the microparticles are oxides. In particular, under the severe conditions such as high temperature and irradiation of a laser beam, oxidation of resin tends to be accelerated. However, aforesaid microparticles of inorganic oxide are prevented from deterioration caused by oxidation.

Further, it is naturally possible to add antioxidants in resin material in order to prevent the resin from oxidation caused by other factors.

Materials described in JP-A 2004-144951, JP-A 2004-144953, JP-A 2004-144954 are suitable for a preferable material to be base material.

Inorganic microparticles to be dispersed in thermoplastic resin are not limited in particular, and suitable microparticles can be arbitrarily selected from inorganic microparticles which reduce the ratio (hereinafter, |dn/dT|) of change in refractive index with the temperature. To be concrete, oxide microparticles, metal salt microparticles and semiconductor microparticles are preferably used, and it is preferable to use by selecting properly those in which absorption, light emission and fluorescence are not generated in the wavelength range employed for an optical element, from the aforesaid microparticles.

The following metal oxide is used for oxide microparticles used in the structure according to the present invention: a metal oxide constructed by one or more kinds of metal selected by a group including Li, Na, Mg, Al, Si, K, Ca, Sc, Ti, V, Cr, Mn, Fe, Co, Ni, Cu, Zn, Rb, Sr, Y, Nb, Zr, Mo, Ag, Cd, In, Sn, Sb, Cs, Ba, La, Ta, Hf, W, Ir, Tl, Pb, Bi and rare earth metal. More specifically, for example, oxide such as silicon oxide, titanium oxide, zinc oxide, aluminum oxide, zirconium oxide, hafnium oxide, niobium oxide, tantalum oxide, magnesium oxide, calcium oxide, strontium oxide, barium oxide, indium oxide, tin oxide, lead oxide; complex oxide compounds these oxides such as lithium niobate, potassium niobate and lithium tantalate, the aluminum magnesium oxide ($MgAl_2O_4$) are cited. Furthermore, rare earth oxides are used for the oxide microparticles in the structure according to the present invention. More specifically, for example, scandium oxide, yttrium oxide, lanthanum trioxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide are cited. As metal salt microparticles, the carbonate, phosphate, sulfate, etc. are cited. More specifically, for example, calcium carbonate, aluminum phosphate are cited.

Moreover, semiconductor microparticles in the structure according to the present invention mean the microparticles constructed by a semiconducting crystal. The semiconducting crystal composition examples include simple substances of the 14th group elements in the periodic table such as carbon, silica, germanium and tin; simple substances of the 15th group elements in the periodic table such as phosphor (black phosphor); simple substances of the 16th group elements in the periodic table such as selenium and tellurium; compounds comprising a plural number of the 14th group elements in the periodic table such as silicon carbide (SiC); compounds of an element of the 14th group in the periodic table and an element of the 16th group in the periodic table such as tin oxide (IV) ($SnO_2$), tin sulfide (II, IV) (Sn(II) Sn(IV) $S_3$), tin sulfide (IV) ($SnS_2$), tin sulfide (II) (SnS), tin selenide (II) (SnSe), tin telluride (II) (SnTe), lead sulfide (II) (PbS), lead selenide (II) (PbSe) and lead telluride (II) (PbTe); compounds of an element of the 13th group in the periodic table and an element of the 15th group in the periodic table (or III-V group compound semiconductors) such as boron nitride (BN), boron phosphide (BP), boron arsenide (BAs), aluminum nitride (AlN), aluminum phosphide (AlP), aluminum arsenide (AlAs), aluminu antimonide (AlSb), gallium nitride (GaN), gallium phosphide (GaP), gallium arsenide (GaAs), gallium antimonide (GaSb), indium nitride (InN), indium phophide (InP), indium arsenide (InAs) and indium antimonide (InSb); compounds of an element of the 13th group in the periodic table and an element of the 16th group in the periodic table such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide ($In_2Se_3$) and indium telluride ($In_2Te_3$); compounds of an element of the 13th group in the periodic table and an element of the 16th group in the periodic table such as thallium chloride (I) (TlCl), thallium bromide (I) (TlBr), thallium iodide (I) (TlI); compounds of an element of the 12th group in the periodic table and an element of the 16th group in the periodic table (or II-VI group compound semiconductors) such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe) and mercury telluride (HgTe); compounds of an element of the 15th group in the periodic table and an element of the 16th group in the periodic table such as arsenic sulfide (III) ($As_2S_3$), arsenic selenide (III) ($As_2Se_3$), arsenic telluride (III) ($As_2Te_3$), antimony sulfide (III) ($Sb_2S_3$), antimony selenide (III) ($Sb_2Se_3$), antimony telluride (III) ($Sb_2Te_3$), bismuth sulfide (III) ($Bi_2S_3$), bismuth selenide (III) ($Bi_2Se_3$) and bismuth telluride (III) ($Bi_2Te_3$); compounds of an element of the 11th group in the periodic table and an element of the 16th group in the periodic table such as copper oxide (I) ($Cu_2O$) and copper selenide (I) ($Cu_2Se$); compounds of an element of the 11th group in the periodic table and an element of the 17th group in the periodic table such as copper chloride (I) (CuCl), copper bromide (I) (CuBr), copper iodide (I) (CuI), silver chloride (AgCl) and silver bromide (AgBr); compounds of an element of the 10th group in the periodic table and an element of the 16th group in the periodic table such as nickel oxide (II) (NiO); compounds of an element of the 9th group in the periodic table and an element of the 16th group in the periodic table such as cobalt oxide (II) (CoO) and cobalt sulfide (II) (CoS); compounds of an element of the 8th group in the periodic table and an element of the 16th group in the periodic table such as triiron tetraoxide ($Fe_3O_4$) and iron sulfide (II) (FeS); compounds of an element of the 7th group in the periodic table and an element of the 16th group in the periodic table such as manganese oxide (II) (MnO); compounds of an element of the 6th group in the periodic table and an element of the 16th group in the periodic table such as molybdenum sulfide (IV) ($MoS_2$) and tungsten oxide(IV) ($WO_2$); compounds of an element of the 5th group in the periodic table and an element of the 16th group in the periodic table such as vanadium oxide (II) (VO), vanadium oxide (IV) ($VO_2$) and tantalum oxide (V) ($Ta_2O_5$); compounds of an element of the 4th group in the periodic table and an element of the 16th group in the periodic table such as titanium oxide (such as $TiO_2$, $Ti_2O_5$, $Ti_2O_3$ and $Ti_5O_9$); compounds of an element of the 2th group in the periodic table and an element of the 16th group in the periodic table such as magnesium sulfide (MgS) and magnesium selenide (MgSe); chalcogen spinels such as cadmium oxide (II) chromium (III) ($CdCr_2O_4$), cadmium selenide (II) chromium (III) ($CdCr_2Se_4$), copper sulfide (II) chromium (III) ($CuCr_2S_4$) and mercury selenide (II) chromium (III) ($HgCr_2Se_4$); and barium titanate ($BaTiO_3$). Further, semiconductor clusters structures of which are established such as $BN_{75}(BF_2)_{15}F_{15}$, described in Adv. Mater., vol. 4, p. 494 (1991) by G. Schmid, et al.; and $Cu_{146}Se_{73}(triethylphosphine)_{22}$ described in Angew. Chem. Int. Ed. Engl., vol. 29, p. 1452 (1990) by D. Fenske are also listed as examples.

In general, dn/dT of thermoplastic resin has a negative value, namely, a refractive index becomes smaller as the temperature rises. Therefore, it is preferable to disperse microparticles having large dn/dT, in order to make |dn/dT| of thermoplastic resin composition to be efficiently small. It is preferable that the absolute value of dn/dT of the microparticles is smaller than that of the thermoplastic resin used as a base material when using microparticles having dn/dT with same sign to the sign of dn/dT of the thermoplastic resin. Furthermore, microparticles having positive dn/dT, which is microparticles having different sign of dn/dT from that of the thermoplastic resin which is a base material, are preferably used. By dispersing these kinds of microparticles into the thermoplastic resin, |dn/dT| of thermoplastic resin composition can effectively become small with less amount of the microparticles. It is possible to properly select dn/dT of microparticles to be dispersed corresponding to a value of dn/dT of thermoplastic resin to become a base material. However, it is preferable that dn/dT of microparticles is greater than $-20\times10^{-6}$ and it is more preferable that dn/dT of microparticles is greater than $-10\times10^{-6}$ when microparticles are dispersed into a thermoplastic resin which is preferably employed to a general optical element. As microparticles having large dn/dT, gallium nitride, zinc sulfate, zinc oxide, lithium niobate and lithium tantalite, for example, are preferably used.

On the other hand, when dispersing microparticles in thermoplastic resin, it is preferable that a difference of refractive index between the thermoplastic resin to become a base material and the microparticles is small. Scattering is hardly caused when light is transmitted, if a difference of refractive index between the thermoplastic resin and the microparticles to be dispersed is small. In case of dispersing microparticles in the thermoplastic resin, microparticles in larger size easily cause scattering when light flux transmits the material. However, in a material in which a difference of refractive index between the thermoplastic resin and the microparticles to be dispersed is small, an occurrence of light scattering becomes low even when relatively large-sized microparticles are used. A difference of refractive index between the thermoplastic resin and the microparticles to be dispersed is preferably within the range of 0-0.3, and more preferably within the range of 0-0.15.

Refractive indexes of thermoplastic resins preferably used as optical materials are in the range about 1.4-1.6 in many cases. As materials to be dispersed in these thermoplastic resins, silica (silicon oxide), calcium carbonate, aluminum phosphate, aluminum oxide, magnesium oxide, and aluminum.magnesium oxides, for example, are preferably used.

Further, dn/dT of thermoplastic resin composition can be made small effectively, by dispersing microparticles whose refractive index is relatively low. As a reason why |dn/dT| of thermoplastic resin composition including dispersed microparticles with low refractive index becomes small, it is considered that temperature changes of the volume fraction of inorganic microparticles in the resin composition may work to make the |dn/dT| of the resin composition to become smaller when the refractive index of the microparticles is lower, although the details are not clarified. As microparticles having a relatively low refractive index, silica (silicon oxide), calcium carbonate and aluminum phosphate, for example, are preferably used.

It is difficult to simultaneously achieve all of improving an effect of lowering dn/dT of the thermoplastic resin composition, improving of light transmittance and a desired refractive index. Therefore, microparticles to be dispersed in the thermoplastic resin can be selected properly by considering a magnitude of dn/dT of a microparticle itself, a difference of dn/dT between microparticles and the thermoplastic resin to become a base material, and the refractive index of the microparticles, depending on the characteristics which are required for the thermoplastic resin composition. Further, it is preferable, for maintaining light transmittance, to properly select microparticles which hardly cause light scattering with considering its affinity with the thermoplastic resin to become a base material, in other words, characteristics of the microparticles in dispersion for the thermoplastic resin.

For example, when using cyclic olefin polymer preferably employed for an optical element as a base material, silica is preferably used as microparticles which make |dn/dT| small while keeping light transmittance.

For the microparticles mentioned above, it is possible to use either one type of inorganic microparticles or plural types of inorganic microparticles in combination. By using plural types of microparticles each having a different characteristic, the required characteristics can further be improved efficiently.

Inorganic microparticles relating to the present invention preferably has an average particle size being 1 nm or larger and being 30 nm or smaller and more preferably has an average particle size being 1 nm or more and being 10 nm or less. When the average particle size is less than 1 nm, dispersion of the inorganic microparticles is difficult, resulting in a fear that the required efficiency may not be obtained, therefore, it is preferable that the average particle size is 1 nm or more. When the average particle size exceeds 30 nm, thermoplastic material composition obtained becomes muddy and transparency is lowered, resulting in a fear that the light transmittance may become less than 70%, therefore, it is preferable that the average particle size is 30 nm or less. The average particle size mentioned here means volume average value of a diameter (particle size in conversion to sphere) in conversion from each particle into a sphere having the same volume as that of the particle.

Further, a form of an inorganic microparticle is not limited in particular, but a spherical microparticle is used preferably. To be concrete, a range of 0.5-1.0 for the ratio of the minimum size of the particle (minimum value of the distance between opposing two tangents each touching the outer circumference of the microparticle)/the maximum size (maximum value of the distance between opposing two tangents each touching the outer circumference of the microparticle) is preferable, and a range of 0.7-1.0 is more preferable.

A distribution of particle sizes is not limited in particular, but a relatively narrow distribution is used suitably, rather than a broad distribution, for making the invention to exhibit its effect efficiently.

The objective optical element will be described below. At least one optical surface of the objective optical element comprises a central area and a peripheral area around the central area. More preferably, at least one optical surface of the objective optical element further comprises a most peripheral area around the peripheral area. By providing the most peripheral area, it allows to more appropriately record and/or reproduce information for the optical disk using the high NA. The central area preferably is an area having the optical axis of the objective optical element, however, it may also be the area not including the optical axis. It is preferable that the central area, peripheral area, and most peripheral area are provided on the same optical surface. As shown in FIG. 1, it is preferable that the central area CN, peripheral area MD, most peripheral area OT are provided on the same optical surface concentrically around the optical axis. Further, the first optical path difference providing structure is provided in the central area of the objective optical element. The second optical path difference providing structure is provided in the peripheral area. When the most peripheral area is provided, the most peripheral area may be a refractive surface, or the third optical path difference providing structure may be provided in the most peripheral area. It is preferable that each of the central area, peripheral area, most peripheral area adjoins to the neighboring area, however, there may be slight gaps between adjoining areas.

The area where the first optical path difference providing structure is provided is preferably 70% or more of the area of the central area on the objective optical element. It is more preferably 90% or more of the area of the central area. The first optical path difference providing structure is furthermore preferably provided on the entire surface of the central area. The area where the second optical path difference providing structure is provided is preferably 70% or more of the peripheral area on the objective optical element. It is more preferably 90% or more of the area of the peripheral area. The second optical path difference providing structure is further more preferably provided on the entire surface of the peripheral area. The area where the third optical path difference providing structure is provided, is 70% or more of the area of the most peripheral area on the objective optical element. It is more preferably 90% or more of the area of the most peripheral area. The third optical path difference providing structure is more preferably provided on the entire surface of the most peripheral area.

Hereupon, the optical path difference providing structure used in the present specification, is the general name of the structure by which an optical path difference is provided to an incident light flux. The optical path difference providing structure also includes the phase difference providing structure by which the phase difference is provided. Further, the phase difference providing structure includes a diffractive structure. The optical path difference providing structure comprises a step, preferably, comprises a plurality of steps. This step provides an optical path difference and/or phase difference to an incident light flux. The optical path difference added by the optical path difference providing structure may also be an integer times of the wavelength of the incident light flux, or may also be non-integer times of the wavelength of the incident light flux. The step may also be arranged with periodic interval in the direction perpendicular to the optical axis, or may also be arranged with non-periodic interval in the direction perpendicular to the optical axis.

It is preferable that the optical path difference providing structure comprises a plurality of ring-shaped zones arranged concentrically around the optical axis. Further, the optical path difference providing structure can have various sectional shapes (cross sectional shapes in the plane including the optical axis). One of the most common optical path difference providing structure provides the sectional shape including the optical axis, which is in the serrated shape, as shows in FIG. 2($a$). Even when the cross sectional shape of the optical path difference providing structure arranged on the flat plane looks a stepped shape, the same optical path difference providing structure arranged on an aspheric surface can be considered as the serrated shape shown in FIG. 2($a$). Accordingly, in the present specification, it is defined that the sectional shape in the serrated shape includes the sectional shape in the stepped shape. Each of the first optical path difference providing structure and the second optical path difference providing structure of the present specification, may have a sectional shape which is formed by overlapping different optical path difference providing structures having serrated shape. For example, FIG. 2($b$) shows the structure in which the fine serrated shaped optical path difference providing structure and the rough serrated optical path difference providing structure overlap with each other.

Further, the first optical path difference providing structure provided in the central area of the objective optical element and the second optical path difference providing structure provided in the peripheral area of the objective optical element may be provided on the different optical surface of the objective optical element. However, it is preferable that the first and second optical path difference providing structures are provided on the same optical surface. By providing them on the same optical surface, it reduces the decentration error at the time of the manufacture, which is preferable. Further, it is preferable that the first optical path difference providing structure and the second optical path difference providing structure are provided on the surface on the light source side of the objective optical element, rather than the surface on the optical disk side of the objective optical element. Further, when the objective optical element comprises a most peripheral area including the third optical path difference providing structure, it is preferable that also the third optical path difference providing structure is arranged on the same optical surface to that of the first and second optical path difference providing structure.

When the objective optical element has a fourth optical path difference providing structure, it is preferable that the fourth optical path difference providing structure is provided on an optical surface which is different from an optical surface on which a first optical path difference providing structure and a second optical path difference providing structure are provided. It is further preferable that the fourth optical path difference providing structure is provided on the surface of the objective optical element closer to an optical disk.

The objective optical element converges a first light flux, a second light flux and a third light flux which pass through a central area where the first optical path difference providing structure of the objective optical element is provided, so that each of them may form a converged spot. Preferably, the objective optical element converges a first light flux which passes through a central area where the first optical path difference providing structure of the objective optical element is provided, so that recording and/or reproducing of information may be conducted on an information recording surface of the first optical disk. Further, the objective optical element converges a second light flux which passes through a central area where the first optical path difference providing structure of the objective optical element is provided, so that recording and/or reproducing of information may be conducted on an information recording surface of the second optical disk. Further, the objective optical element converges a third light flux which passes through a central area where the first optical path difference providing structure of the objective optical element is provided, so that recording and/or reproducing of information may be conducted on an information recording surface of the third optical disk. When thickness t1 of a protective substrate of a first optical disk is different from thickness t2 of a protective substrate of a second optical disk, it is preferable that the first optical path difference providing structure corrects spherical aberration caused by a difference between thickness t1 of a protective substrate of the first optical disk and thickness t2 of a protective substrate of the second optical disk and/or spherical aberration caused by a difference of wavelength between the first light flux and the second light flux, for the first light flux and the second light flux which pass through the first optical path difference providing structure. In addition, it is preferable that the first optical path difference providing structure corrects spherical aberration caused by a difference between thickness t1 of a protective substrate of the first optical disk and thickness t3 of a protective substrate of the third optical disk and/or spherical aberration caused by a difference of wavelength between the first light flux and the third light flux, for the first light flux and the third light flux which pass through the first optical path difference providing structure.

Further, the third light flux which passes through the first optical path difference providing structure of the objective optical element forms the first best focus where a spot diameter of the spot formed by the third light flux is the smallest and the second best focus where a spot diameter of the spot formed by is the second smallest to the first best focus. Incidentally, it is assumed that the best focus mentioned in this case means a point where beam-waist is minimum within a certain range of defocus. In other words, forming of the first best focus and the second best focus by the third light flux means that at least two points where the beam-waist is minimum within a certain range of defocus exist in the third light flux. Incidentally, it is preferable that, in the third light flux passing the first optical path providing structure, a diffracted light having the maximum light amount forms the first best focus, and a diffracted light having the second largest light amount forms the second best focus. Further, when the diffraction efficiency of a diffracted light forming the first best focus is greater than that of the diffracted light forming the second best focus, and when a difference between them is 15% or more (preferably, 30% or more), an effect of the invention that light utilization efficiency can be enhanced in the third light flux becomes more conspicuous.

It is preferable that a spot formed by the third light flux at the first best focus is used for recording and/or reproducing for the third optical disk and a spot formed by the third light flux at the second best focus is not used for recording and/or reproducing for the third optical disk. However, an embodiment wherein a spot formed by the third light flux at the first best focus is not used for recording and/or reproducing for the third optical disk and a spot formed by the third light flux at the second best focus is used for recording and/or reproducing for the third optical disk, is not denied. Meanwhile, when the first optical path difference providing structure is provided on the surface of the objective optical element facing a light source, there are considered two cases including one occasion where the second best focus is closer to the objective optical element than the first best focus is and another occasion where the second best focus is farther from the objective optical element than the first best focus is. For example, when a zero-th order diffracted light of the third light flux forms the second best focus, a position of the second best focus is closer to the objective optical element than that of the first best focus formed by the first order diffracted light of the third light flux. On the other hand, when the second best focus is formed by the second order diffracted light of the third light flux, a position of the second best focus is farther from the objective optical element than that of the first best focus formed by the first order diffracted light of the third light flux.

Further, the first best focus and the second best focus satisfy the following expression (1):

$$0 < L/f < 0.05 \tag{1}$$

Where, f [mm] represents a focal length of the third light flux that passes through the first optical path difference providing structure and forms the first best focus, while, L [mm] represents a distance between the first best focus and the second best focus.

Incidentally, it is more preferable to satisfy the following expression (1').

$$0.01 \leq L/f \leq 0.043 \tag{1'}$$

More preferable is to satisfy the following expression (1").

$$0.016 \leq L/f \leq 0.042 \tag{1"}$$

Further, L is preferably 0.03 mm or more, and 0.11 mm or less, and f is preferably 1.8 mm or more, and 3.0 mm or less.

It is preferable to satisfy the aforesaid expression (1), (1') or (1"), both for improving the light utilization efficiency for recording and/or reproducing for the third optical disk and for maintaining sufficient light utilization efficiency for recording and/or reproducing information for the first optical disk and the second optical disk.

The objective optical element converges the first light flux and the second light flux each of which passes through a peripheral area where the second optical path difference providing structure of the objective optical element is arranged, so as to form a converged spot. Preferably, the objective optical element converges the first light flux that passes through a peripheral area where the second optical path difference providing structure of the objective optical element is arranged so as to record and/or reproduce information on the information recording surface of the first optical disk. Further, the objective optical element converges the second light flux that passes through a peripheral area where the second optical path difference providing structure of the objective optical element is arranged so as to record and/or reproduce information on an information recording surface of the second optical disk. Further, when thickness t1 of a protective substrate of a first optical disk is different from thickness t2 of a protective substrate of a second optical disk, it is preferable that the second optical path difference providing structure corrects spherical aberration caused by a difference between thickness t1 of a protective substrate of the first optical disk and thickness t2 of a protective substrate of the second optical disk and/or spherical aberration caused by a difference of wavelength between the first light flux and the second light flux, for the first light flux and the second light flux which pass through the second optical path difference providing structure.

Further, as a preferable embodiment, there is given an embodiment wherein the third light flux which passes the peripheral area is not used for recording and/or reproducing information for the third optical disk. It is preferable to make the third light flux passing through a peripheral area not to contribute to forming of a converged spot on an information recording surface of the third optical disk. In other words, it is preferable that the third light flux passing through a peripheral area where the second optical path difference providing structure of the objective optical element is provided forms flare on an information recording surface of the third optical disk. As shown in FIG. 3, a spot formed on an information recording surface of the third optical disk by the third light flux passing the objective optical element comprises central spot portion SCN having high light density, intermediate spot portion SMD having light density that is lower than that of the central spot portion and peripheral spot portion SOT having light density that is higher than that of the intermediate spot portion and is lower than that of the central spot portion, in this order from the optical axis side (or central spot portion) to the outer side. The central spot portion is used for recording and/or reproducing of information for an optical disk, while, the intermediate spot portion and the peripheral spot portion are not used for recording and/or reproducing of information for an optical disk. In the foregoing, this peripheral spot portion is called a flare. In other words, the third light flux which passes through the second optical path difference providing structure provided on a peripheral area of the objective optical element forms a peripheral spot portion on an information recording surface of the third optical disk. Incidentally, it is preferable that a converged spot or a spot of the third light flux mentioned in this case is a spot at the first best focus. Further, it is preferable that a spot formed on an information recording surface of the second optical disk comprises a central spot portion, an intermediate spot portion and a peripheral spot portion, in the second light flux passing through the objective optical element.

In the meantime, when employing the structure in which the second optical path difference providing structure is arranged in the peripheral area of the objective optical element and the third light flux passing through the peripheral area of the objective optical element forms a flare on an information recording surface of the third optical disk, there occurs a problem that spherical aberrations of a high order are caused extremely, when the first light flux is used for recording and/or reproducing for the first optical disk, and when a wavelength of the first light flux is changed from the design wavelength or a temperature is changed. Incidentally, the spherical aberrations of a high order mentioned in this case mean spherical aberrations of fifth to ninth order. Therefore, by arranging so that the second optical path difference providing structure may comprise the second basic structure, the fourth basic structure or the fifth basic structure which will be described later, it is possible to reduce the spherical aberration of a high order, even in the case where the first light flux is used for the first optical disk, a wavelength of the first light flux is changed from the design wavelength and a temperature is changed. What is especially preferable is to satisfy the following expressions (2) and (2'). Satisfying the following expression (2") is more preferable.

$$\delta SAH/\delta\lambda \leq 0.010 \ (\lambda rms/nm) \tag{2}$$

$$\delta SAH = \sqrt{((\delta SA5)^2 + (\delta SA7)^2 + (\delta SA9)^2)} \tag{2'}$$

$$\delta SAH/\delta\lambda \leq 0.008 \ (\lambda rms/nm) \tag{2"}$$

Where, δSA5 is a fifth order spherical aberration generated when information is recorded and/or reproduced for the first optical disk using a light flux with a wavelength λx which is shifted from a using wavelength of 408 nm, and generated at a magnification, which makes a third order spherical aberration SA3 zero, of the light flux with the wavelength of λx for the objective optical element. δSA7 is a seventh order spherical aberration generated when information is recorded and/or reproduced for the first optical disk using a light flux with the wavelength λx, and generated at a magnification, which makes a third order spherical aberration SA3 zero, of the light flux with the wavelength of λx for the objective optical element. δSA9 is a ninth order spherical aberration generated when information is recorded and/or reproduced for the first optical disk using a light flux with the wavelength λx, and generated at a magnification, which makes a third order spherical aberration SA3 zero, of the light flux with the wavelength of λx for the objective optical element. δλ is an absolute value of a difference between 408 nm and λx nm. Incidentally, δλ that is 10 nm or less is preferable.

Further, for reducing spherical aberrations of a high order, it is preferable that according to a graph whose horizontal axis represents a distance from an optical axis in a direction of a radius of the objective optical element, and whose vertical axis represents an optical path difference of the first light flux provided by the objective optical element when the first light flux passes through the objective optical element, the graph comprises a discontinuity at a wavelength which is shifted by 5 nm from a designed wavelength of the first wavelength of the objective optical element. Then it is also preferable that the gap width of the optical path difference at the discontinuity is 0 or more, and 0.2 λ1 or less. When the gap width of the optical path difference is 0, it means that the graph has no discontinuous portion.

Further, it is preferable that the second optical path difference providing structure corrects spherochromatism (chromatic spherical aberration) generated by slight fluctuation of a wavelength of the first light source or the second light source, for the first light flux and the second light flux both passing through the second optical path difference providing structure. The slight fluctuation of a wavelength means a fluctuation within ±10 nm. For example, when the first light flux is changed in terms of a wavelength by 5 nm from wavelength λ1, it is preferable that the fluctuation of spherical aberration of the first light flux passing through a peripheral area is corrected by the second optical path difference providing structure, and an amount of change of wavefront aberration on an information recording surface of the first optical disk is made to be 0.010 λ1 rms or more, and 0.095 λ1 rms or less. Further, when the second light flux is changed in terms of a wavelength by 5 nm from wavelength λ2, it is preferable that the fluctuation of spherical aberration of the second light flux passing a peripheral area is corrected by the second optical path difference providing structure, and an amount of change of wave front aberration on an information recording surface of the second optical disk is made to be 0.002 λ2 rms or more, and 0.03 λ2 rms or less. Owing to this, it is possible to correct aberration caused by fluctuations of wavelength resulting from manufacturing errors of a laser or an individual difference of lasers.

It is preferable that the second optical path difference providing structure further corrects a spherical aberration caused by temperature change in an objective optical element, for the first light flux and the second light flux both passing through the second optical path difference providing structure. For example, when a temperature of the objective optical element is changed by ±30° C., it is preferable that the fluctuation of spherical aberration of the first light flux or the second light flux passing through a peripheral area is corrected by the second optical path difference providing structure, and an amount of change of wavefront aberration on an information recording surface of the first optical disk is made to be 0.010 λ1 rms or more, and 0.095 λ1 rms or less, and an amount of change of wavefront aberration on an information recording surface of the second optical disk is made to be 0.002 λ2 rms or more, and 0.03 λ2 rms or less.

When the objective optical element comprises a most peripheral area, the objective optical element converges the first light flux passing through the most peripheral area of the objective optical element so as to record and/or reproduce information on an information recording surface of the first optical disk. Further, in the first light flux passing through the most peripheral area, it is preferable that its spherical aberration is corrected in the case of recording and/or reproducing information for the first optical disk.

As a preferable embodiment, there is given an embodiment wherein a second light flux passing through the most peripheral area is not used for recording and/or reproducing information for the second optical disk, and a third light flux passing through the most peripheral area is not used for recording and/or reproducing information for the third optical disk. It is preferable that the second light flux and the third light flux both passing through the most peripheral area are arranged not to contribute to forming of converged spot respectively on an information recording surface of the second optical disk and on an information recording surface of the third optical disk. In other words, when the objective optical element comprises the most peripheral area, it is preferable that the third light flux passing through the most peripheral area of the objective optical element forms a flare on an information recording surface of the third optical disk. In other words, it is preferable that the third light flux passing through the most peripheral area of the objective optical element forms a peripheral spot portion on an information recording surface of the third optical disk. Further, when the objective optical element comprises a most peripheral area, it is preferable that the second light flux passing through the most peripheral area of the objective optical element forms a flare on an information recording surface of the second optical disk. In other words, it is preferable that the second light flux passing through the most peripheral area of the objective optical element forms a peripheral spot portion on an information recording surface of the second optical disk.

When the most peripheral area comprises the third optical path difference providing structure, it is also possible to arrange so that the third optical path difference providing structure corrects spherochromatism (chromatic spherical aberration) caused by slight fluctuations of a wavelength of the first light source, for the first light flux passing through the third optical path difference providing structure. The slight fluctuation of a wavelength means a fluctuation within ±10 nm. For example, when the first light flux is changed in terms of a wavelength by 5 nm from wavelength $\lambda 1$, it is preferable that the fluctuation of spherical aberration of the first light flux passing through a most peripheral area is corrected by the third optical path difference providing structure, and an amount of change of wave front aberration on an information recording surface of the first optical disk is made to be 0.010 $\lambda 1$ rms or more, and 0.095 $\lambda 1$ rms or less.

The third optical path difference providing structure corrects also spherical aberration caused by temperature changes of the objective optical element, for the first light flux passing through the third optical path difference providing structure, which is preferable. For example, when a temperature of the objective optical element is changed by ±30° C., the fluctuation of spherical aberration of the first light flux passing through a most peripheral area is corrected by the third optical path difference providing structure, and an amount of change of wavefront aberration on an information recording surface of the first optical disk is made to be 0.010 $\lambda 1$ rms or more, and 0.095 $\lambda 1$ rms or less, which is preferable.

In the meantime, it is preferable that the first optical path difference providing structure is a structure comprising at least a first basic structure.

The first basic structure is an optical path difference providing structure which emits a first order diffracted light flux with a larger light amount than any diffracted light fluxes with the other diffraction order, when the first light flux passes through the first basic structure; which emits a first order diffracted light flux with a larger light amount than any diffracted light fluxes with the other diffraction order, when the second light flux passes through the first basic structure; and which emits a first order diffracted light flux with a larger light amount than any diffracted light fluxes with the other diffraction order, when the third light flux passes through the first basic structure. The first basic structure is preferably an optical path difference providing structure that causes diffraction angles respectively of the first light flux, the second light flux and the third light flux all passing through the first basic structure to be different from each other. It is further preferable that step amount along the optical axis of the first basic structure provides an optical path difference of almost the same as large as the first wavelength with the first light flux, provides an optical path difference of almost 0.6 times as large as the second wavelength with the second light flux, and provides an optical path difference of almost 0.5 times as large as the third wavelength with the third light flux.

Further, for the purpose of correcting spherical aberration generated by temperature changes, correcting chromatic aberration and/or causing parallel light or substantially parallel light to enter the objective optical element in the course of conducting recording and/or reproducing for all optical disks, a structure wherein the third basic structure or the fifth basic structure is overlapped on the first basic structure may also be the first optical path difference providing structure.

The third basic structure is an optical path difference providing structure which emits a second order diffracted light flux with a larger light amount than any diffracted light fluxes with the other diffraction order, when the first light flux passes through the third basic structure; which emits a first order diffracted light flux with a larger light amount than any diffracted light fluxes with the other diffraction order, when the second light flux passes through the third basic structure; and which emits a first order diffracted light flux with a larger light amount than any diffracted light fluxes with the other diffraction order, when the third light flux passes through the third basic structure. The third basic structure is preferably an optical path difference providing structure that causes diffraction angle of the second light flux passing through the third basic structure to be different from the diffraction angles of the first and the third light fluxes passing through the third basic structure. It is further preferable that step amount along the optical axis of the third basic structure provides an optical path difference of almost 2 times as large as the first wavelength with the first light flux, provides an optical path difference of almost 1.2 times as large as the second wavelength with the second light flux, and provides an optical path difference of almost the same as large as the third wavelength with the third light flux. The fifth basic structure is an optical path difference providing structure which emits a tenth order diffracted light flux with a larger light amount than any diffracted light fluxes with the other diffraction order, when the first light flux passes through the fifth basic structure; which emits a sixth order diffracted light flux with a larger light amount than any diffracted light fluxes with the other diffraction order, when the second light flux passes through the fifth basic structure; and which emits fifth order diffracted light fluxes each with a larger light amount than any diffracted light fluxes with the other diffraction order, when the third light flux passes through the fifth basic structure. It is further preferable that step amount along the optical axis of the fifth basic structure provides an optical path difference of almost 10 times as large as the first wavelength with the first light flux, provides an optical path difference of almost 6 times as large as the second wavelength with the second light flux, and provides an optical path difference of almost 5 times as large as the third wavelength with the third light flux.

The second optical path difference providing structure is of the structure comprising at least a predetermined basic structure.

A predetermined basic structure in this case means an optical path difference providing structure which emits a x-th order diffracted light flux with a larger light amount than any diffracted light fluxes with the other diffraction order, when the first light flux passes through the predetermined basic structure; and which emits a y-th order diffracted light flux with a larger light amount than any diffracted light fluxes with the other diffraction order, when the second light flux passes through the predetermined basic structure. Incidentally, x and y satisfy the following expression (8):

$$0.9\cdot(x\cdot\lambda1)/(n1-1) \leq (y\cdot\lambda2)/(n2-1) \leq 1.2\cdot(x\cdot\lambda1)/(n1-1) \quad (8)$$

Where, x represents an integer excluding 0, y represents an integer excluding 0, n1 represents a refractive index of the objective optical element for the first light flux and n2 represents a refractive index of the objective optical element for the second light flux.

As a basic structure, satisfying above expression (8), there are given, for example, a second base structure, a fourth basic structure and the fifth basic structure previously described.

The second basic structure is an optical path difference providing structure which emits a fifth order diffracted light flux with a larger light amount than any diffracted light fluxes with the other diffraction order, when the first light flux passes through the second basic structure; which emits a third order diffracted light flux with a larger light amount than any diffracted light fluxes with the other diffraction order, when the second light flux passes through the second basic structure; and which emits third and second order diffracted light fluxes each with a larger light amount than any diffracted light fluxes with the other diffraction order, when the third light flux passes through the second basic structure. It is preferable that the amount of the third order diffracted light flux is slightly larger than the amount of the second order diffracted light flux, in the third light flux. It is preferable that step amount along the optical axis of the second basic structure provides an optical path difference of almost 5 times as large as the first wavelength with the first light flux, provides an optical path difference of almost 3 times as large as the second wavelength with the second light flux, and provides an optical path difference of almost 2.5 times as large as the third wavelength with the third light flux. The fourth basic structure is an optical path difference providing structure which emits a third order diffracted light flux with a larger light amount than any diffracted light fluxes with the other diffraction order, when the first light flux passes through the fourth basic structure; which emits a second order diffracted light flux with a larger light amount than any diffracted light fluxes with the other diffraction order, when the second light flux passes through the fourth basic structure; and which emits second and first order diffracted light fluxes each with a larger light amount than any diffracted light fluxes with the other diffraction order, when the third light flux passes through the fourth basic structure. It is preferable that the amount of the second order diffracted light flux is slightly larger than the amount of the first order diffracted light flux, in the third light flux. It is preferable that step amount along the optical axis of the fourth basic structure provides an optical path difference of almost 3 times as large as the first wavelength with the first light flux, provides an optical path difference of almost 1.9 times as large as the second wavelength with the second light flux, and provides an optical path difference of almost 1.6 times as large as the third wavelength with the third light flux. Meanwhile, the second basic structure, the fourth basic structure and the fifth basic structure (especially, the second basic structure and the fifth basic structure) have a function to make spherical aberration to be under-corrected when a temperature rises and wavelengths of the first light source, the second light source and the third light source are made longer. Accordingly, thereby, an over-corrected spherical aberration caused by a decline of the refractive index of plastic in the case of temperature rise can be corrected, resulting in an excellent state with less spherical aberration. Incidentally, it is possible to make a depth of a step to be smaller for the second basic structure than for the fifth basic structure. Further, the second basic structure, the fourth basic structure, or the fifth basic structure in the second optical path difference providing structure may be arranged on a base aspheric surface (base surface) which differs from the other basic structure. It is preferable that the second basic structure, the fourth basic structure, and the fifth basic structure in the second optical path difference providing structure may be arranged on a base aspheric surface (base surface) configured to provide the optical path differences as described above for respective incident light fluxes and configured such that the second basic structure, the fourth basic structure, and the fifth basic structure do not affect the direction of the incident light flux as well as possible. It is further preferable that each of the second basic structure, the fourth basic structure, and the fifth basic structure in the second optical path difference providing structure may be a structure such that the structure goes more inside of the optical element in the direction of the optical axis at the point on the optical element apart farther from the optical axis in the perpendicular direction to the optical axis, then from a certain point, it goes more upper side of the optical element in the direction of the optical axis at the point on the optical element apart farther from the optical axis in the perpendicular direction to the optical axis. In other words, each of the second basic structure, the fourth basic structure, and the fifth basic structure in the second optical path difference providing structure may be a structure in which depth of the step becomes deeper as the point of the objective optical element becomes farther from the optical axis in the direction perpendicular to the optical axis, and from the certain position, depth of the step becomes shallower as the point of the objective optical element becomes farther from the optical axis in the direction perpendicular to the optical axis.

Further, satisfying the following expression (8') is preferable.

$$0.95\cdot(x\cdot\lambda1)/(n1-1) \leq (y-\lambda2)/(n1-1) \leq 1.05\cdot(x\cdot\lambda1)/(n1-1) \quad (8')$$

As a basic structure satisfying the aforesaid expression (8'), there is given, for example, the second basic structure or the fifth basic structure. Hereupon, the fourth basic structure does not satisfy the expression (8').

Further, the second optical path difference providing structure is preferably of the structure in which the predetermined basic structure and another basic structure are overlapped to each other, and another basic structure stated above is either one of the third basic structure, the fourth basic structure previously described and a sixth basic structure, which are preferable. The sixth basic structure is an optical path difference providing structure which emits a zero-th order diffracted light flux with a larger light amount than any diffracted light fluxes with the other diffraction order, when the first light flux passes through the sixth basic structure; which emits a first order diffracted light flux with a larger light amount than any diffracted light fluxes with the other diffraction order, when the second light flux passes through the sixth basic structure; and which emits zero-th order diffracted light flux each with a larger light amount than any diffracted light fluxes with the other diffraction order, when the third light flux passes through the sixth basic structure. The sixth basic structure preferably comprises a plurality of small stepped structures each having four steps. It is further preferable that step amount along the optical axis of one step of the small stepped structure provides an optical path difference of almost 2 times as large as the first wavelength with the first light flux, provides an optical path difference of almost 1.2 times as large as the second wavelength with the second light flux, and provides an optical path difference of almost the same as large as the third wavelength with the third light flux. The whole small stepped structure comprising four steps preferably provides an optical path difference of almost 8 times as large as the first wavelength with the first light flux, provides an optical path difference of almost 5 times as large as the second wavelength with the second light flux, and provides an optical path difference of almost 4 times as large as the third wavelength with the third light flux.

Further, the third basic structure may further be overlapped on the second optical path difference providing structure, for the purpose of correcting chromatic aberration and/or causing parallel light or substantially parallel light to enter the objective optical element in the course of conducting recording and/or reproducing for all optical disks.

Further, when an objective optical element is a plastic lens, it is preferable to comprise a most peripheral area comprising the third optical path difference providing structure. In this case, the third optical path difference providing structure is a structure comprising at least one of the first basic structure, the second basic structure, the third basic structure, the fourth basic structure, the fifth basic structure previously described and a eighth basic structure. The eighth basic structure is an optical path difference providing structure which emits a fourth order diffracted light flux with a larger light amount than any diffracted light fluxes with the other diffraction order, when the first light flux passes through the eighth basic structure; which emits third and second order diffracted light fluxes with a larger light amount than any diffracted light fluxes with the other diffraction order, when the second light flux passes through the eighth basic structure; and which emits second order diffracted light flux with a larger light amount than any diffracted light fluxes with the other diffraction order, when the third light flux passes through the eighth basic structure. It is further preferable that step amount along the optical axis of the eighth basic structure provides an optical path difference of almost 4 times as large as the first wavelength with the first light flux, provides an optical path difference of almost 2.5 times as large as the second wavelength with the second light flux, and provides an optical path difference of almost 2 times as large as the third wavelength with the third light flux. Incidentally, when the second optical path difference providing structure comprises the third basic structure, the third optical path difference providing structure preferably comprises the first basic structure, the second basic structure, the fourth basic structure, the fifth basic structure or the eighth basic structure. On the other hand, when the second optical path difference providing structure comprises the fourth basic structure, the third optical path difference providing structure preferably comprises the first basic structure, the second basic structure, the third basic structure, the fifth basic structure or the eighth basic structure. Further, from the viewpoint of manufacturing, the second basic structure is preferable because it can be manufactured easily. Further, from the viewpoint of controlling a width of fluctuations in diffraction efficiency and in light utilization efficiency caused by temperature changes and wavelength changes to be smaller, the third basic structure and the fourth basic structure are preferable, but a transmittance is slightly lowered especially in the fourth basic structure. It is therefore possible to select the basic structure of the third optical path difference depending on the purpose.

When the objective optical element is a glass lens or a lens made of athermal resin, it is preferable to have a most peripheral area being a refractive surface.

Each of the first optical path difference providing structure, the second optical path difference providing structure and the third optical path difference providing structure can be divided into plural areas, and each area can also be made of a different basic structure. Especially, each of the second optical path difference providing structure and the third optical path difference providing structure can be divided into plural areas, and each area can also be made of a different basic structure. For example, the second optical path difference providing structure can be divided into an inner side area closer to an optical axis and an outer side area surrounding the inner side area, and the inner side area can be made of the structure wherein the second basic structure and the third basic structure are overlapped to each other, while the outer side area can be made of the structure wherein the second basic structure, the third basic structure and a seventh basic structure which will be described later are overlapped to each other.

From the viewpoint of realizing easy manufacture of a molding die and of improving transferring properties of a molding die, it is preferable that a pitch width of a step is not too small. Therefore, when ring-shaped zones having a pitch width of 5 µm or less are generated when designing an optical path difference providing structure representing a basis by overlapping plural basic structures, it is preferable to obtain a final optical path difference providing structure by eliminating ring-shaped zones having a pitch width of 5 µm or less. When ring-shaped zones with pitch width of 5 µm or less are convex, the ring-shaped zones can be shaved off for eliminating the ring-shaped zones having a pitch width of 5 µm or less, while, when ring-shaped zones with pitch width of 5 µm or less are concave, it is possible to fill up the ring-shaped zones for eliminating.

Therefore, it is preferable that every pitch width of at least the first optical path difference providing structure is greater than 5 µm. Preferably, every pitch width in all of the first optical path difference providing structure, the second optical path difference providing structure and the third optical path difference providing structure is greater than 5 µm.

Further, it is preferable that a step amount is not too large. When an amount of a step of ring-shaped zones equipped with an optical path difference providing structure representing a basis obtained by overlapping plural basic structures is higher than a standard value, it is possible to reduce an excessive amount of a step without affecting optical performances, by lowering an amount of a step of ring-shaped zones by $10 \cdot \lambda B/(n-1)$ (µm). With respect to the standard value, it is preferable to set $10 \cdot \lambda B/(n-1)$ (µm) as a standard value, although an optional value can be set as a standard value. The symbol $\lambda B$ represents a design wavelength (µm) of the first light flux, while, n represents a refractive index of an optical element for wavelength $\lambda B$.

Meanwhile, the pitch width means a width of the ring-shaped zone in a direction perpendicular to the optical axis. The step amount means depth of the step of the ring-shaped zone in a direction of the optical axis.

From the viewpoint that less ring-shaped zones which are long and narrow are preferable for manufacturing, it is preferable that a value of (step amount/pitch width) is 1 or less for all ring-shaped zones of the first optical path difference providing structure, and it is more preferable that the aforesaid value is 0.8 or less. What is more preferable is that a value of (step amount/pitch width) is 1 or less for all ring-shaped zones of all optical path difference providing structures, and it is more preferable that the aforesaid value is 0.8 or less.

Here, NA1 represents the image side numerical aperture of the objective optical element, necessary for reproducing and/or recording information for the first optical disk. NA2 (NA1≧NA2) represents that the image side numerical aperture of the objective optical element necessary for reproducing and/or recording for the information to the second optical disk. NA3 (NA2>NA3) represents that the image side numerical aperture of the objective optical element necessary for reproducing and/or recording information for the third optical disk. It is preferable that NA1 is one of: 0.8 or more, and 0.9 or less; and 0.55 or more, and 0.7 or less. Specifically, preferable NA1 is 0.85. It is preferable that NA2 is 0.55 or more, and is 0.7 or less. Specifically, preferable NA2 is 0.60. Further, it is preferable that NA3 is 0.4 or more, and is 0.55 or less. Specifically, preferable NA3 is 0.45 or 0.53.

It is preferable that the border of the central area and the peripheral area in the objective optical element is formed in a portion corresponding to the range being 0.9·NA3 or more and being 1.2·NA3 or less (more preferably, 0.95·NA3 or more, and 1.15·NA3 or less) for the third light flux. More preferably, the border of the central area and the peripheral area of the objective optical element is formed in a portion corresponding to NA3. Further, it is preferable that the border of the peripheral area and the most peripheral area of the objective optical element is formed in a portion corresponding to the range being 0.9·NA2 or more, and being 1.2·NA2 or less (more preferably, being 0.95·NA2 or more, and being 1.15·NA2 or less) for the second light flux. More preferably, the border of the peripheral area and the most peripheral area of the objective optical element is formed in a portion corresponding to NA2. It is preferable that the border of the outside of the most peripheral area of the objective optical element is formed in a portion corresponding to the range being than 0.9·NA1 or more, and being 1.2·NA1 or less (more preferably, being 0.95·NA1 or more, and being 1.15·NA1 or less) for the first light flux. More preferably, the border of the outside of the most peripheral area of the objective optical element is formed in a portion corresponding to NA1.

When the third light flux passing through the objective optical element is converged on the information recording surface of the third optical disk, it is preferable that the spherical aberration has at least one discontinuous portion. In that case, it is preferable that the discontinuous portion exists in the range being 0.9·NA3 or more, and being 1.2·NA3 or less (more preferably, being 0.95·NA3 or more, and being 1.15·NA3 or less) for the third light flux. Further, also when the second light flux passing through the objective optical element is converged on the information recording surface of the second optical disk, it is preferable that the spherical aberration has at least one discontinuous portion. In that case, it is preferable that the discontinuous portion exists in the range being 0.9·NA2 or more, and being 1.2·NA2 or less (more preferably, being 0.95·NA2 or more, and being 1.1·NA2 or less) for the second light flux.

Further, when the spherical aberration is continuous and does not have the discontinuous portion, and when the third light flux passing through the objective optical element is converged on the information recording surface of the third optical disk, it is preferable that the absolute value of the vertical spherical aberration is 0.03 µm or more in NA2, and the absolute value of the vertical spherical aberration is 0.02 µm or less in NA3. More preferably, the absolute value of the vertical spherical aberration is 0.08 µm or more in NA2, and the absolute value of the vertical spherical aberration is 0.01 µm or less in NA3. Further, when the second light flux passing through the objective optical element is converged on the information recording surface of the second optical disk, it is preferable that the absolute value of the vertical spherical aberration is 0.03 µm or more in NA1, and the absolute value of the vertical spherical aberration is 0.005 µm or less in NA2.

Further, because the diffraction efficiency depends on the depth (step amount) of the ring-shaped zone in the diffractive structure, the diffraction efficiency of the central area for each wavelength can be appropriately set corresponding to the use of the optical pickup apparatus. For example, in the case of the optical pickup apparatus for recording and reproducing information on the first optical disk, and only for reproducing information on the second and the third optical disks, it is preferable that the diffraction efficiency of the central area and/or the peripheral area is defined with considering primarily the diffraction efficiency for the first light flux. On the other hand, in the case of the optical pickup apparatus only for reproducing information on the fist optical disks and for recording and reproducing information on the second and third optical disks, it is preferable that the diffraction efficiency of the central area is defined with considering primarily the diffraction efficiency for the second and third light fluxes and the peripheral area is defined with considering primarily the diffraction efficiency for the second light flux.

In any case, when the following conditional expression (14) is satisfied, the diffraction efficiency of the first light flux calculated by the area weighted mean can be secured high.

$$\eta 11 \leqq \eta 21 \tag{14}$$

Where, $\eta 11$ expresses is an efficiency of a light utilization of the first light flux in the central area, $\eta 21$ expresses is an efficiency of a light utilization of the first light flux in the peripheral area. Hereupon, when the efficiency of a light utilization of the central area is defined with considering primarily the light fluxes with the second and the third wavelengths, the efficiency of a light utilization of the first light flux of the central area is decreased. However, in the case where the numerical aperture of the first optical disk is larger than the numerical aperture of the third optical disk, when considered on the whole effective diameter of the first light flux, the decrease of the efficiency of a light utilization the central area does not give so much large influence.

Further, it is preferable that the following expression (3) is satisfied:

$$\eta 13 \geqq 40\% \tag{3}$$

Where, $\eta 13$ represents an efficiency of a light utilization for the third light flux in a central area.

The light utilization efficiency mentioned in the present specification can be defined as follows. In the objective optical element in which the first optical path difference providing structure and the second optical path difference providing structure (and the third optical path difference providing structure) are formed, when a light flux entering an area other than a target for measurement is intercepted, A represents a light amount in an airy disc of a converged spot formed on an information recording surface of an optical disk corresponding to the light flux used for measurement. While, in the objective optical element formed of the same material to the above objective optical element and having the same focal length, axial thickness, numerical aperture, and wavefront wavelength, in which none of the first optical path difference providing structure, the second optical path difference providing structure, and the third optical path difference providing structure are formed, when a light flux entering an area other than a target for measurement is intercepted, B represents a light amount in an airy disc of a converged spot formed on an information recording surface of an optical disk corresponding to the light flux used for measurement. The light utilization efficiency is to be calculated based on A/B. Meanwhile, the airy disc mentioned in this case means a circle with radius r' whose center is on an optical axis of the converged spot. The radius of the circle is indicated by $r'=0.61 \cdot \lambda/NA$.

For recording and/or reproducing information for the first optical disk and the second optical disk properly while improving light utilization efficiency in the case of recording and/or reproducing information for the third optical disk, it is preferable that a blaze wavelength is made to be a wavelength between the first wavelength and the second wavelength. It is more preferable that the blaze wavelength is not less than 405 nm and is not more than 600 nm.

In the third light flux passing through the first optical path difference providing structure, it is preferable that a difference between a light amount for diffracted light having a diffraction order number that makes a light amount to be a maximum and a light amount for diffracted light having a diffraction order number that makes a light amount to be second largest, namely, a difference between a light amount for diffracted light forming the first best focus and a light amount for diffracted light forming the second best focus is 15% or more. The difference of 30% or more is more preferable.

The first light flux, the second light flux, and the third light flux may either enter the objective optical element as parallel light fluxes, or enter the objective optical element as divergent light fluxes or convergent light fluxes. Preferably, magnification m1 of the first light flux entering into the objective optical element satisfies the following expression (4).

$$-0.02 < m1 < 0.02 \tag{4}$$

While, magnification m1 of the first light flux entering into the objective optical element as a divergent light flux satisfies the following expression (4').

$$-0.10 < m1 < 0.00 \tag{4'}$$

When the second light flux enters into the objective optical element as a parallel light flux or as a substantially parallel light flux, it is preferable that magnification m2 of the second light flux entering into the objective optical element satisfies the following expression (5).

$$-0.02 < m2 < 0.02 \tag{5}$$

On the other hand, when the second light flux enters into the objective optical element as a divergent light flux, it is preferable that magnification m2 of the second light flux entering into the objective optical element satisfies the following expression (5').

$$-0.10 < m2 < 0.00 \tag{5'}$$

When the third light flux enters into the objective optical element as a parallel light flux or as a substantially parallel light flux, it is preferable that magnification m3 of the third light flux entering into the objective optical element satisfies the following expression (6).

$$-0.02 < m3 < 0.02 \tag{6}$$

When the aforesaid expression (6) is satisfied, namely, when the third light flux enters into the objective optical element as a parallel or substantially parallel light flux, the objective optical element preferably comprises a fourth optical path difference providing structure. When providing the fourth optical path difference providing structure on the objective optical element, the fourth optical path difference providing structure preferably is provided on an optical surface which is different from the optical surface on which the first optical path difference providing structure and the second optical path difference providing structure are provided. Further, the fourth optical path difference providing structure is preferably provided on the surface of the objective optical element closer to the optical disk side. The fourth optical path difference providing structure is preferably of the structure to correct chromatic spherical aberration. Further, the fourth optical path difference providing structure is preferably of the structure to comprise any one of the second basic structure, the third basic structure, the fifth basic structure and the sixth basic structure. Incidentally, when the fourth optical path difference providing structure comprises the third basic structure, the fourth optical path difference providing structure may have a function to correct spherical aberration caused by a difference between thickness t1 of a protective substrate of the first optical disk and thickness t2 of a protective substrate of the second optical disk for the first light flux and the second light flux, and this function can be shared by the second optical path difference providing structure and the fourth optical path difference providing structure, which is preferable.

When the aforesaid expression (6) is satisfied, a basic structure having the function to correct chromatic aberration may also be overlapped on at least one of the first optical path difference providing structure, the second optical path difference providing structure and the third optical path difference providing structure (preferably, two of them, more preferably, all of them), without providing the fourth optical path difference providing structure. For example, it is also possible to employ the structure wherein either one of the second basic structure, the third basic structure, the fifth basic structure and the sixth basic structure is overlapped on at least one of the first optical path difference providing structure, the second optical path difference providing structure and the third optical path difference providing structure. Especially, when the expressions (4), (5), and (6) are satisfied, especially when all of the first light flux, second light flux, and third light flux enters into the objective optical element as parallel light fluxes and the fourth optical path difference providing structure are not provided on the objective optical element, the third basic structure is preferably overlapped to the first optical path difference providing structure.

On the other hand, when the third light flux enters into the objective optical element as a divergent light flux, it is preferable that magnification m3 of the third light flux entering into the objective optical element satisfies the following expression (7).

$$-0.10 < m3 < 0.00 \tag{7}$$

When the objective optical element comprises a plastic lens, it is preferable to keep excellent temperature characteristic. In this case, it is preferable that the expression (16) is satisfied. Further it is preferable to keep balance between a wavelength characteristic and a temperature characteristic. To satisfy these characteristics, following conditional expressions (16) and (17) are preferably satisfied:

$$+0.0005 (\text{WFE}\lambda\text{rms}/(^\circ \text{C.} \cdot \text{mm})) \leq \delta\text{SAT1}/f \leq +0.0020 \\ (\text{WFE}\lambda\text{rms}/(^\circ \text{C.} \cdot \text{mm})) \tag{16}$$

$$-0.00020 (\text{WFE}\lambda\text{rms}/(\text{nm} \cdot \text{mm})) \leq \delta\text{SA}\lambda/f \leq -0.00002 \\ (\text{WFE}\lambda\text{rms}/(\text{nm} \cdot \text{mm})) \tag{17}$$

where, $\delta$SAT1 represents $\delta$SA3/$\delta$T (rate of change of third order spherical aberration caused by temperature change) of the objective optical element in the case of recording/reproducing information for an optical disk in a using wavelength (assuming no wavelength fluctuation caused by temperature change, in this case). The using wavelength means a wavelength of a light source used in an optical pickup apparatus comprising an objective optical element. Preferably, the using wavelength is a wavelength being 400 nm or more, and 415 nm or less with which information can be recorded and/or reproduced for an optical disk through an objective optical element. When the using wavelength cannot be established as in the foregoing, 408 nm may be used as the using wavelength to obtain δSAT1 of the objective optical element as well as δSAT2 and δSAT3 which will be described later. Meantime, WFE shows that third order spherical aberration is expressed by wavefront aberration. Further, δSAλ represents δSA3/δλ (rate of change of third order spherical aberration caused by wavelength change) of the objective optical element in the case of recording and/or reproducing information for an optical disk in the using wavelength. Incidentally, it is preferable that an ambient temperature is a room temperature. The room temperature is 10° C. or more, and 40° C. or less, and it preferably is 25° C. The symbol f represents a focal length of the objective optical element in a light flux with wavelength λ1 (preferably, wavelength 408 nm).

In further description, it is preferable to consider changes in wavelength of a light source caused by temperature changes, in addition to changes in spherical aberration of the objective optical element caused by temperature changes. What is preferable is to satisfy the following conditional expression (18):

$$0 \text{ (WFE}\lambda\text{rms}/(°\text{C.·mm})) \leq \delta SAT2/f \leq +0.0020 \text{ (WFE}\lambda\text{rms}/(°\text{C.·mm}))$$ (18)

where, δSAT2 represents δSA3/δT of the objective optical element in the case of recording and/or reproducing information for an optical disk in a light source wherein wavelength fluctuation caused by temperature changes is 0.05 nm/° C.

It is more preferable that the following conditional expression (18') is satisfied.

$$0 \text{(WFE}\lambda\text{rms}/(°\text{C.·mm})) \leq \delta SAT2/f \leq +0.0015 \text{ (WFE}\lambda\text{rms}/(°\text{C.·mm}))$$ (18')

When a light converging optical system of the optical pickup apparatus comprises a coupling lens such as a collimator lens, and the coupling lens is a plastic lens, satisfying the following conditional expression (19) is preferable:

$$0 \text{ (WFE}\lambda\text{rms}/(°\text{C.·mm})) \leq \delta SAT3/f \leq +0.0015 \text{ (WFE}\lambda\text{rms}/(°\text{C.·mm}))$$ (19)

where, δSAT3 represents δSA3/δT of the total optical system including a coupling lens and an objective optical element, in the case of recording and/or reproducing information for a high density optical disk in a light source wherein wavelength fluctuation caused by temperature changes is 0.05 nm/° C.

A working distance (WD) of an objective optical element in the case of using a third optical disk is preferably 0.15 mm or more, and 1.5 mm or less. It is more preferable to be 0.2 mm or more, and 0.4 mm or less. Next, WD of an objective optical element in the case of using a second optical disk is preferably 0.3 mm or more, and 0.7 mm or less. Further, WD of an objective optical element in the case of using a first optical disk is preferably 0.4 mm or more, and 0.9 mm or less. For t1<t2, it is preferable to be 0.6 mm or more, and 0.9 mm or less.

When the objective optical element is a single lens, the thinner axial thickness of the lens is more preferable for lengthening the above WD. On the other, however, if the lens is made to be too thin, an influence of the temperature change on the plastic lens grows too great, which is not preferable. Thus, satisfying the following conditional expression (15) is preferable.

$$1 \leq T/f \leq 1.13$$ (15)

Where, T (mm) represents an axial thickness of the objective optical element and f (mm) represents a focal length of the objective optical element in the third light flux. It is preferable that an axial thickness of the objective optical element is 2.31 mm or more, and 2.61 mm or less.

An incident pupil diameter of the objective optical element is preferably 2.8 mm or more, and 4.5 mm or less when a first optical disk is used.

From the viewpoint of reducing, as far as possible, an influence exerted on a sensor for tracking by unwanted light passing through a central area, in the case of conducting tracking for a third optical disk such as CD, the following conditional expression (1") is preferably satisfied.

$$0.02 \leq L/f < 0.05$$ (1")

Satisfying the following conditional expression (1''') is more preferable.

$$0.032 < L/f < 0.05$$ (1''')

However, if a distance between a first best focus and a second best focus is extended as stated above, there comes into being a possibility that a third light flux passing through the peripheral area also enters a light receiving element to have an influence on accuracy of recording and/or reproducing in the case of recording and/or reproducing for a third optical disk. When satisfying the aforesaid conditional expression (1") for reducing the possibility to exert the influence, it is preferable 1) to provide a structure for outreaching a third light flux as a flare as far as possible on a peripheral area and/or on a most peripheral area, or 2) to provide an aperture restricting element.

First, 1) providing the structure for outreaching a third light flux as a flare as far as possible on a peripheral area and/or on a most peripheral area, will be explained.

A preferable state of the third light flux to pass through a peripheral area and/or a most peripheral area in recording and/or reproducing for a third optical disc will be explained first. When recording and/or reproducing of the third optical disk is assumed, in the vertical spherical aberration diagram whose vertical axis is a height from the optical axis along the direction perpendicular to the optical axis, whose horizontal axis is a defocus amount, it can be regarded as a more preferable situation when an absolute value of a difference between a defocus amount of the third light flux passing through the central area of the objective optical element and a defocus amount of the third light flux passing through the peripheral area and/or the most peripheral area is larger. Therefore, when satisfying the aforesaid conditional expression (1"), and when a minimum value of an absolute value of a difference between a defocus amount of the third light flux passing through the central area of the objective optical element and a defocus amount of the third light flux passing through the peripheral area and/or the most peripheral area is 10 μm or less in the vertical spherical aberration diagram in which recording and/or reproducing for the third optical disk is assumed, it is preferable to take the following action. The action is to provide an optical path difference providing structure for outreaching the third light flux as a flare as far as possible on the portion having a height from the optical axis by which the difference of defocus amount is 10 μm or less, so that the minimum value of the difference between the defocus amount of the third light flux passing through the central area of the objective optical element and the defocus amount of the third light flux passing through the peripheral area and/or the most peripheral area may become larger than 10 μm, which is preferable. Namely, in the vertical spherical aberration diagram in the case of satisfying the aforesaid conditional expression (1"), it is preferable that the minimum value for the absolute value of the difference between the defocus amount of the third light flux passing through the central area of the objective optical element (which may also be an area that is not more than a necessary numerical aperture of the third optical disk) and the defocus amount of the third light flux passing through the peripheral area and/or the most peripheral area (which may also be an area that is not less than a necessary numerical aperture of the third optical disk) is larger than 10 μm. The minimum value exceeding 15 μm is more preferable.

Meanwhile, when satisfying conditional expression (1"), it is preferable that the second optical path difference providing structure and/or the third optical path difference providing structure comprises, on at least on part of its area, the seventh basic structure, as a structure for outreaching the third light flux as a flare as far as possible, in addition to other basic structures. The seventh basic structure is an optical path difference providing structure which emits a zero-th order diffracted light flux with a larger light amount than any diffracted light fluxes with the other diffraction order, when the first light flux passes through the seventh basic structure; which emits a zero-th order diffracted light flux with a larger light amount than any diffracted light fluxes with the other diffraction order, when the second light flux passes through the seventh basic structure; and which emits a first order diffracted light flux with a larger light amount than any diffracted light fluxes with the other diffraction order, when the third light flux passes through the seventh basic structure. It is further preferable that step amount along the optical axis of the seventh basic structure provides an optical path difference of almost 5 times as large as the first wavelength with the first light flux, provides an optical path difference of almost 3 times as large as the second wavelength with the second light flux, and provides an optical path difference of almost 2.5 times as large as the third wavelength with the third light flux. The seventh basic structure preferably comprises a binary shape repeating one step concavity and convexity. As an example, there is given the second optical path difference providing structure whose inside area closer to an optical axis has the structure in which the second basic structure and the third basic structure are overlapped to each other and whose outside area farther than the inside area from an optical axis has the structure in which the second basic structure, the third basic structure and the seventh basic structure are overlapped to each other. In particular, it is preferable to provide the seventh basic structure on a portion of the height from an optical axis described in the previous paragraph. In many cases, it is preferable to provide the seventh basic structure on the side of the peripheral area that is farther from the optical axis, and to provide the seventh basic structure on the side of the most peripheral area that is closer to the optical axis.

Next, the preferable state of the second light flux that passes through the most peripheral area in the course of recording and/or reproducing for the second optical disk, will be explained. When recording and/or reproducing of the second optical disk is assumed, in the vertical spherical aberration diagram, it can be regarded as a more preferable situation when an absolute value of a difference between a defocus amount of the second light flux passing through the central area and the peripheral area of the objective optical element and a defocus amount of the second light flux passing through the most peripheral area is larger. Therefore, when satisfying the aforesaid conditional expression (1"), and when a minimum value of an absolute value of a difference between a defocus amount of the second light flux passing through the central area and the peripheral area of the objective optical element and a defocus amount of the second light flux passing through the most peripheral area is 10 μm or less, in the vertical spherical aberration diagram in which recording and/or reproducing for the second optical disk is assumed, it is preferable to take the following action. The action is to provide an optical path difference providing structure for outreaching the second light flux as a flare as far as possible on the portion having a height from the optical axis by which the difference of defocus amount is 10 μm or less, so that the minimum value of the difference between the defocus amount of the second light flux passing through the central area and the peripheral area of the objective optical element and the defocus amount of the second light flux passing through the most peripheral area may become larger than 10 μm, which is preferable. Namely, in the vertical spherical aberration diagram in the case of satisfying the aforesaid conditional expression (1"), it is preferable that the minimum value for the absolute value of the difference between the defocus amount of the second light flux passing through the central area and the peripheral area of the objective optical element (which may also be an area that is not less than a necessary numerical aperture of the second optical disk) and the defocus amount of the second light flux passing through the most peripheral area (which may also be an area that is not less than a necessary numerical aperture of the second optical disk) is larger than 10 μm. The minimum value exceeding 15 μm is more preferable.

Incidentally, when satisfying the conditional expression (1"), it is preferable to provide a structure for outreaching a second light flux as a flare as far as possible on the third optical path difference providing structure. For example, the third optical path difference providing structure can comprise, on at least a part of its area, a third basic structure as a structure for outreaching the second light flux greatly as a flare. Meanwhile, it is difficult to declare the best structure for outreaching the second light flux greatly as a flare, because of relationship with other optical path difference providing structures. As an example, there is given the third optical path difference providing structure whose inside area closer to an optical axis has the structure that is composed only of the third basic structure and whose outside area farther than the inside area from the optical axis has the structure that is composed only of the second basic structure. Further, in this example, it is also possible to divide the inside area of the third optical path difference providing structure into two areas and thereby to make an inside-inside area of the third optical path difference providing structure closer to an optical axis to have the structure that is composed of third basic structure and the seventh basic structure and to make an outside-inside area that is farther from the optical axis than the inside-inside area to have the structure that is composed only of third basic structure. As other example, it is also possible to divide the third optical path difference providing structure into two areas, inside area and outside area, and thereby to make an inside area of the third optical path difference providing structure closer to an optical axis to have the structure in which the seventh basic structure and the second basic structure are overlapped with each other and to make an outside area of the third optical path difference providing structure farther from the optical axis than the inside area to have the structure composed only of the second basic structure.

Next, providing an opening limiting element of 2) will be explained. When providing the seventh basic structure to the second optical path difference providing structure and/or the third optical path difference providing structure as stated above, there is a possibility that +first order diffracted light and/or −first order diffracted light of the third light flux generated by the seventh basic structure enters a light-receiving element, depending on the optical design. To avoid this possibility, it is preferable to provide an opening limiting element. In this case, it is not necessary to provide the seventh basic structure to the second optical path difference providing structure and/or the third optical path difference providing structure.

It is preferable that the opening limiting element is arranged on the point closer to the first light source, the second light source, and the third light source than the objective optical element in a common optical path of the first, second and third light fluxes. Further, the opening limiting element comprises a first area closest to an optical axis, and a second area arranged farther position from the optical axis than the first area. The first area transmits the first light flux, the second light flux, and the third light flux. The second area transmits the first light flux and the second light flux and the third light flux are not converged at a light converging position of the third light flux which passes through the first area of the opening limiting element and the objective optical element. As the second area is in two types including a type which does not converge light at the converging position of the third light flux which passes through the first area by transmitting the first light flux and the second light flux and preventing the third light flux from transmitting as a dichroic filter; and a type which does not converge light at the conversing position of the third light flux which passes through the first area by transmitting the first light flux and the second light flux and making the third light flux flare, as a diffractive optical element. The third light fluxes which passes through the first area enters into the central area of the objective optical element. As a substantial example of the opening limiting element of this kind, a dichroic filter and a diffractive optical element are preferably used, and in particular, the dichroic filter wherein blue light, red light and infrared light are transmitted in the area close to the optical axis, and blue light and red light are transmitted and infrared light is not transmitted in the area that is away from the optical axis, is used favorably.

Further, in many cases, an optical pickup apparatus comprises a λ/4 wavelength plate for converting a linear polarized light to a circular polarized light or for converting a circular polarized light to a linear polarized light. The opening limiting element may also be united with this λ/4 wavelength plate.

As preferable examples of the λ/4 wavelength plate, there are given roughly the following three types, to which, however, the examples are is not limited thereto. As a first type of the λ/4 wavelength plate, there is given a λ/4 wavelength plate having a high polymer liquid crystal layer which is hardened liquid crystal monomer. For example, there is given a phase plate equipped with a first organic thin film layer and a second organic thin film layer. In the phase plate, the first organic thin film layer has a retardation value of ½ wavelength for light of a certain zone (for example, a visible zone), and the second organic thin film layer has a retardation value of ¼ wavelength for light of the same zone, and the first and second organic thin film layers are overlapped each other so that an optical axis of the first organic thin film layer and that of the second organic thin film layer may intersect at a prescribed angle respectively. These first and second organic thin film layers are high polymer liquid crystal layers. To be specific, for example, contents described in Japanese Patent Publication Open to Public Inspection No. 2004-198942 can be applied to the λ/4 wavelength plate of the first type.

As the λ/4 wavelength plate of the second type, there is given a λ/4 wavelength plate having structural birefringence. For example, there is given one in which two types of media each having a different refractive index are arranged one after the other at a microscopic cycle length (for example, 100-300 nm), and a refractive index cyclic structure showing structural birefringence is provided, and a phase difference is produced by the structural birefringence. Further, as another example, there is given one in which plural wavelength plate elements having a structure of irregular cycle of λ/2<P<λ (P represents structural cycle (μm) and λ represents a wavelength (μm)) are used, and structural dimensions of respective wavelength plate elements are determined so that light transmittance may become high, and are combined. To be specific concerning the latter example, for example, contents described in Japanese Patent Publication Open to Public Inspection No. 2006-139263 can be applied to the λ/4 wavelength plate of the second type.

As the λ/4 wavelength plate of the third type, there is given a λ/4 wavelength plate in which plural high polymer film layers for converting a circular polarized light to a linear polarized light or converting a linear polarized light to a circular polarized light for a specific wavelength zone are layered. To be specific, for example, contents described in EP1134068A can be applied to the λ/4 wavelength plate of the third type.

The optical information recording and reproducing apparatus comprises the optical disk drive apparatus having the above described optical pickup apparatus.

Herein, the optical disk drive apparatus installed in the optical information recording and reproducing apparatus will be described. There is provided the optical disk drive apparatus employing a system of taking out only a tray which can hold an optical disk with the optical disk being, from the main body of the optical information recording and reproducing apparatus in which optical pickup apparatus is housed; and a system of taking out the main body of the optical disk drive apparatus in which the optical pickup apparatus is housed.

The optical information recording and reproducing apparatus using each of the above described systems, is generally provided with the following component members: an optical pickup apparatus housed in a housing; a drive source of the optical pickup apparatus such as seek-motor by which the optical pickup apparatus is moved toward the inner periphery or outer periphery of the optical disk for each housing; traveling means having a guide rail for guiding the optical pickup apparatus toward the inner periphery or outer periphery of the optical disk; and a spindle motor for rotation driving of the optical disk. However, it is to be understood that various changes and modifications will be apparent to those skilled in the art.

The optical information recording and reproducing apparatus employing the former system is provide with, other than these component members, a tray which can hold the optical disk with the optical disk being mounted thereon, and a loading mechanism for slidably moving the tray. The optical information recording and reproducing apparatus employing the latter system does not include the tray and loading mechanism, and it is preferable that each component member is provided in the drawer corresponding to chassis which can be taken out outside.

The invention makes it possible to provide an optical pickup apparatus, an objective optical element and an optical information recording and/or reproducing apparatus in which an appropriated flare can be generated in the course of recording and/or reproducing CD and DVD even when a single lens is used as an objective optical element, and recording and/or reproducing of information can be conducted properly for three types of discs such as high density optical disk, DVD and CD, wherein simplification of their structures and low cost of them can be realized. In addition, it is possible to provide an optical pickup apparatus, an objective optical element and an optical information recording and/or reproducing apparatus wherein light utilization efficiency can be enhanced and sufficient light amount can be secured for all of the three different optical disks.

EXAMPLES

Figure 4:
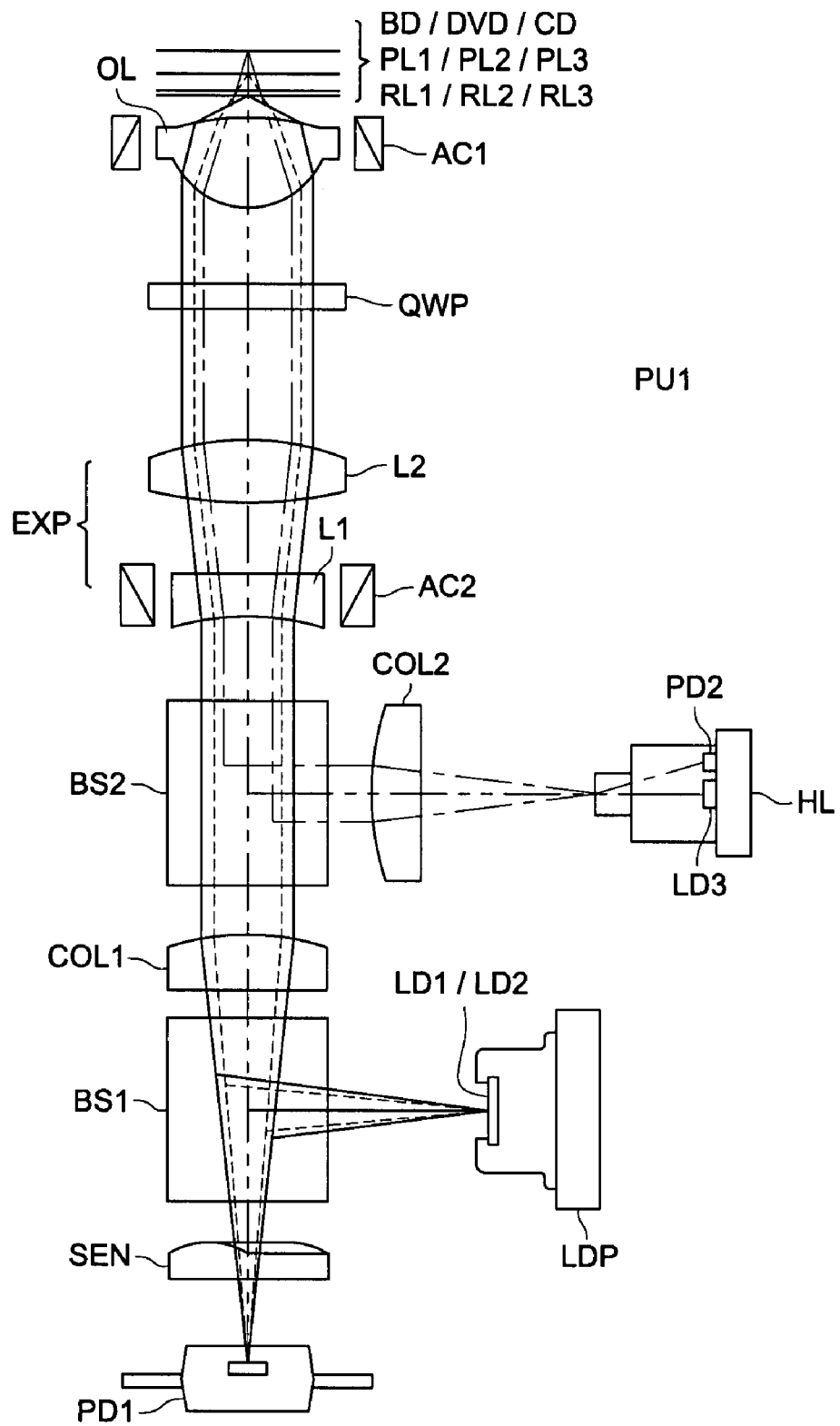
FIG. 4 is a diagram showing schematically the structure of the optical pickup apparatus relating to the invention.

An embodiment of the invention will be explained as follows, referring to the drawings. FIG. 4 is a diagram schematically showing the structure of optical pickup apparatus PU1 in the present embodiment which can record and/or reproduce information properly for BD, DVD and CD each being different from others. The optical pickup apparatus PU1 of this kind can be installed in an optical information recording and/or reproducing apparatus. In this case, BD represents a first optical disk, DVD represents a second optical disk and CD represents a third optical disk. The invention is not limited to the present embodiment.

The optical pickup apparatus PU1 comprises light source package LDP in which violet semiconductor laser LD1 (first light source) that emits a violet laser light flux (first light flux) with wavelength 408 nm emitted in the case of recording and/or reproducing information for BD, and red semiconductor laser LD2 (second light source) that emits a laser light flux (second light flux) with wavelength 658 nm emitted in the case of recording and/or reproducing information for DVD are packed in one package; hologram-laser HL composed of infrared semiconductor laser LD3 (third light source) emitting a laser light flux (third light flux) with wavelength 785 nm emitted in the case of recording and/or reproducing information for CD and of photodetector PD2 that receives reflected light flux coming from information recording surface RL3 of CD; common photodetector PD1 for BD and DVD (Plural light-receiving sections respectively for BD and DVD may also be provided); single objective lens (objective optical element) OL of a one lens group type and is made of polyolefin-based plastic; biaxial actuator AC1, uniaxial actuator AC2; beam expander EXP that is arranged in a common optical path through which the first—third light fluxes pass, and is composed of first lens L1 movable in the optical axis direction by uniaxial actuator AC2 and second lens L2; first polarized light beam splitter BS1; second polarized light beam splitter BS2; ¼ wavelength plate QWP; sensor lens SEN; first collimator COL1 that is arranged in an optical path through which the first light flux and the second light flux pass, and converts the first light flux and the second light flux into parallel light fluxes; and second collimator COL2 that is arranged in an optical path through which the third light flux only passes, and converts the third light flux into collimated light flux. Incidentally, violet SHG laser can also be used in addition to the aforesaid violet semiconductor laser LD1, as a light source for BD. Meanwhile, it is preferable that a coupling lens through which the first light flux passes, namely the first collimator COL1 has, on its optical surface, the structure having a function to correct chromatic aberration, such as an optical path difference providing structure having the second basic structure.

Figure 5:
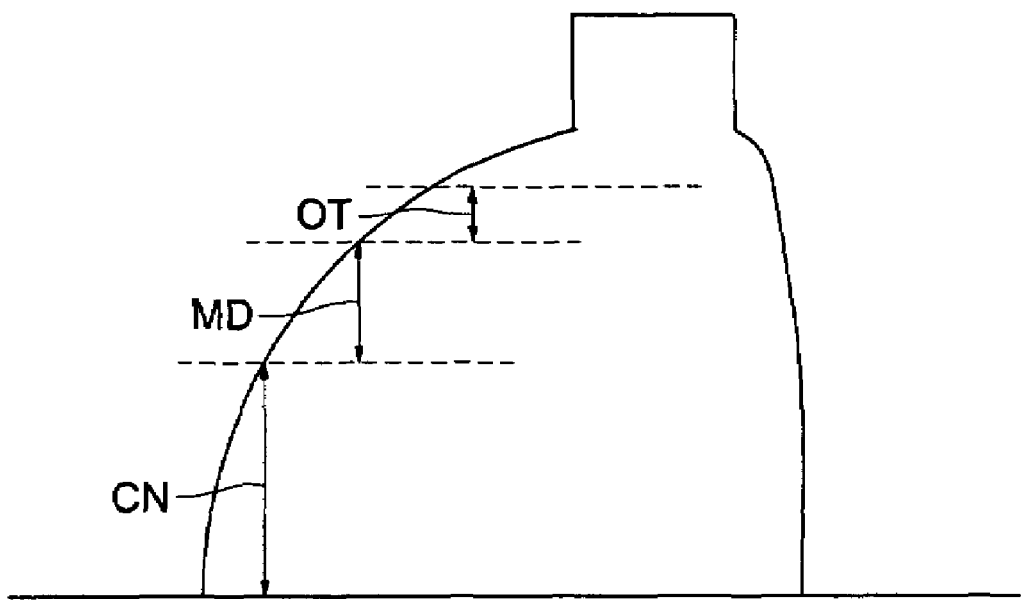
FIG. 5 is a cross-sectional view showing schematically an example of objective optical element OL relating to the present invention.

On an optical surface on the light source side of the objective lens OL in the present embodiment, there are formed central area CN including an optical axis, peripheral area MD arranged to surround the central area and the most peripheral area OT arranged to surround further the peripheral area, with forming concentric circles whose center is on the optical axis, as shown in FIGS. 1 and 5. Meantime, a ratio of an area of each of the central area, the peripheral area and the most peripheral area in FIGS. 1 and 5 is not shown accurately.

In optical pickup apparatus PU1, when recording and/or reproducing information for BD, a position of the first lens L1 in the optical axis direction is adjusted by uniaxial actuator AC2 so that the first light flux may be emitted from beam expander EXP under the state of a parallel light flux, then the violet semiconductor laser LD1 emits light. As shown by a light path drawn with solid lines in FIG. 4, the divergent light flux emitted from the violet semiconductor laser LD1 is converted into a parallel light flux by collimator COL1 after being reflected by first polarized beam splitter BS1. The parallel light flux is expanded in terms of a diameter by beam expander EXP and passes through ¼ wavelength plate QWP to be regulated in terms of a light flux diameter by an unillustrated diaphragm. The regulated light flux enters into objective lens OL under the state of a parallel light flux to become a spot formed on information recording surface RL1 through protective substrate PL1 of BD. A converged spot is formed on information recording surface RL1 of BD by the light flux which passes through central area CN, peripheral area MD, most peripheral area OT and an optical surface on the optical disk side, of the objective lens. Focusing and tracking for the objective lens OL are carried out by biaxial actuator AC1.

The light flux on information recording surface RL1 is reflected and modulated by information pits on information recording surface RL1. The reflected light flux is converted into a converged light flux by the first collimator COL1, after being transmitted again through objective lens OL, ¼ wavelength plate QWP, beam expander EXP and second polarized beam splitter BS2. The converged light flux is given astigmatism by sensor lens SEN after being transmitted through the first polarized beam splitter BS1, and is converged on a light-receiving surface of photodetector PD1. Thus, it is possible to read information recorded on BD by using output signals coming from the photodetector PD1.

Further, in the optical pickup apparatus PU1, when conducting recording and/or reproducing of information for DVD, a position of the first lens L1 in the optical axis direction is adjusted by uniaxial actuator AC2 so that second light flux may be emitted from beam expander EXP under the state of a collimated light flux, then the red semiconductor laser LD2 emits light. As shown by a light path drawn with dotted lines in FIG. 4, the divergent light flux emitted from the red semiconductor laser LD2 is converted into a parallel light flux by collimator COL1 after being reflected by first polarized beam splitter BS1. The parallel light flux is expanded in terms of a diameter by beam expander EXP and passes through ¼ wavelength plate QWP to be regulated in terms of a light flux diameter by an unillustrated diaphragm. The light flux enters into objective lens OL under the state of a parallel light to become a spot formed on information recording surface RL2 through protective substrate PL2 of DVD. A converged spot, namely, a spot central portion is formed on information recording surface RL2 of DVD by the light flux which passes through central area CN, peripheral area MD and an optical surface on the optical disk side, of the objective lens OL. A light flux which passes through the most peripheral area OT is made to be a flare to form a peripheral spot portion. Focusing and tracking for the objective lens OL are carried out by biaxial actuator AC1 arranged on the circumference of the objective lens OL.

The light flux on information recording surface RL2 is reflected and modulated by information pits on information recording surface RL2 and is converted into a converged light flux by the first collimator COL1, after being transmitted again through objective lens OL, ¼ wavelength plate QWP, beam expander EXP and second polarized beam splitter BS2. The converged light flux is given astigmatism by sensor lens SEN after being transmitted through the first polarized beam splitter BS1, and is converged on a light-receiving surface of photodetector PD1. Thus, it is possible to read information recorded on DVD by using output signals coming from the photodetector PD1.

Further, in the optical pickup apparatus PU1, when conducting recording and/or reproducing of information for CD, a position of the first lens L1 in the optical axis direction is adjusted by uniaxial actuator AC2 so that third light flux may be emitted from beam expander EXP under the state of a slightly converged light flux (Example 1) or under the state of a parallel light flux (Example 2), then the infrared semiconductor laser LD3 emits light. As shown by a light path drawn with one-dot chain lines in FIG. 4, the divergent light flux emitted from the infrared semiconductor laser LD3 is converted into a collimated light flux by second collimator COL2. After that, the collimated light flux is reflected by second polarized light beam splitter BS2, to be changed to slightly divergent light flux by beam expander EXP or to be expanded in terms of a diameter while keeping its parallel light flux. Then, the light flux passes through ¼ wavelength plate QWP to become a spot formed on information recording surface RL3 through protective substrate PL3 of CD after entering objective lens OL under the state of a slightly finite divergent light or of a parallel light. A converged spot, namely, a spot central portion is formed on information recording surface RL3 of CD by the light flux which passes through central area CN and an optical surface on the optical disk side of the objective lens OL. A light flux which passes through the most peripheral area OT and peripheral area MD is made to be a flare to form a peripheral spot portion. Focusing and tracking for the objective lens OL are carried out by biaxial actuator AC1 arranged on the circumference of the objective lens OL.

A reflected light flux modulated by information pits on information recording surface RL3 is transmitted again through objective lens OL, ¼ wavelength plate QWP and beam expander EXP, and is reflected by the second polarized beam splitter BS2, to be converted into a converged light flux by the collimator COL2. After that, the converged light flux is converged on photodetector PD2. Thus, information recorded on CD can be read by the use of output signals of the photodetector PD2.

When the first light flux emitted from violet semiconductor laser LD1 enters objective optical element OL, the first optical path difference providing structure of the central area, the second optical path difference providing structure of the peripheral area and third optical path difference providing structure of the most peripheral area can correct properly spherical aberration of the first light flux, and can record and/or reproduce information properly for BD with a protective substrate of thickness t1. When the second light flux emitted from red semiconductor laser LD2 enters objective optical element OBJ, the first optical path difference providing structure of the central area and the second optical path difference providing structure of the peripheral area can correct properly spherical aberration of the second light flux generated by a difference of protective substrate thickness between BD and DVD and by a difference of wavelength between the first light flux and the second light flux, and can record and/or reproduce information properly for DVD with a protective substrate of thickness t2, because the most peripheral area causes the second light flux to be a flare on an information recording surface of DVD. When the third light flux emitted from infrared semiconductor laser LD3 enters objective optical element OL, the first optical path difference providing structure of the central area can correct properly spherical aberration of the third light flux generated by a difference of protective substrate thickness between BD and CD and by a difference of wavelength between the first light flux and the third light flux, and can record and/or reproduce information properly for CD with protective substrate of thickness t3, because the second optical path difference providing structure of the peripheral area and the third optical path difference providing structure of the most peripheral area make the third light flux to be a flare on an information recording surface of CD. Further, since the first optical path difference providing structure of the central area makes the diffraction efficiency of the third light flux used for recording and reproducing to be an excellent one, a light amount of the third light flux which is sufficient for recording and reproducing can be obtained. In addition, the second optical path difference providing structure of the peripheral area can correct spheromatism (chromatic spherical aberration) when the wavelength is deviated from the standard wavelength for the first and second light fluxes for reasons such as manufacturing errors of lasers, and can correct spherical aberration generated by temperature changes when temperatures are changed.

Example 1

Next, an example that can be used in the aforesaid embodiment will be explained. In the following examples, the objective optical element is a single lens made of polyolefin-based plastic. On the entire surface of central area CN on the optical surface of the objective optical element, there is formed the first optical path difference providing structure. On the entire surface of peripheral area MD on the optical surface, there is formed the second optical path difference providing structure. On the entire surface of most peripheral area OT on the optical surface, there is formed the third optical path difference providing structure.

Further, in Example 1, the first optical path difference providing structure is of the structure comprising only the first basic structure, which is in a serrated form as shown schematically in FIG. 2(a). The first basic structure representing a diffractive structure in a serrated form is designed to make a diffracted light amount of the first order of the diffracted first light flux to be greater than a diffracted light amount of a diffracted first light flux with any other diffraction order number (including also zero-th order, namely, transmitted light), then, to make a diffracted light amount of the first order of the diffracted second light flux to be greater than a diffracted light amount of a diffracted second light flux with any other diffraction order number (including also zero-th order, namely, transmitted light) and to make a diffracted light amount of the first order of the diffracted third light flux to be greater than a diffracted light amount of a diffracted third light flux with any other diffraction order number (including also zero-th order, namely, transmitted light).

In Example 1, the second optical path difference providing structure is the structure wherein the second basic structure and the third basic structure are overlapped to each other, and it is in a form wherein two types of diffractive structures in a serrated form are overlapped to each other. The second basic structure representing a rougher diffractive structure in a serrated form is designed to make a diffracted light amount of the fifth order of the first diffracted light flux to be greater than a diffracted light amount of a diffracted first light flux with any other diffraction order number (including also zero-th order, namely, transmitted light), then, to make a diffracted light amount of the third order of the diffracted second light flux to be greater than a diffracted light amount of a diffracted second light flux with any other diffraction order number (including also zero-th order, namely, transmitted light) and to make an amount of diffracted light of the third and second orders of the diffracted third light flux to be greater than a diffracted light amount of a diffracted third light flux with any other diffraction order number (including also zero-th order, namely, transmitted light). The third basic structure representing a finer diffractive structure in a serrated form is designed to make a diffracted light amount of the second order of the diffracted first light flux to be greater than a diffracted light amount of the diffracted first light flux with any other order diffraction number (including also zero-th order, namely, transmitted light), then, to make a diffracted light amount of the first order of the diffracted second light flux to be greater than a diffracted light amount of the diffracted second light flux with any other order diffraction number (including also zero-th order, namely, transmitted light) and to make a diffracted light amount of the first order of the diffracted third light flux to be greater than a diffracted light amount of the diffracted third light flux with any other diffraction order number (including also zero-th order, namely, transmitted light).

In Example 1, the third optical path difference providing structure is of the structure comprising only the second basic structure, and is of the form having only the diffractive structure in a serrated form of one type.

Further, in Example 1, all of the first, second and third optical path difference providing structures are provided on the optical surface on the light source side, and an optical surface of the objective optical element on the optical disk side is a refractive surface. Further, in Example 1, the third light flux enters the objective optical element as a slightly finite divergent light.

The lens data of the Example 1 are shown in Table 1. Hereinafter, the power of 10 will be expressed as by using "E". For example, $2.5 \times 10^{-3}$ will be expressed as 2.5E−3.

Each of optical surfaces of the objective optical system is formed as an aspheric surface, which has a symmetric shape around the optical axis with defined by substituting the coefficients shown in the tables described later into the expression (21).

$$X(h) = \frac{(h^2/r)}{1 + \sqrt{1-(1+\kappa)(h/r)^2}} + \sum_{i=0}^{10} A_{2i} h^{2i} \quad (21)$$

Herein, X(h) is the axis along the optical axis (the direction of traveling light is positive direction), κ is a conical constant, $A_{2i}$ is an aspheric coefficient, h is the height from the optical axis.

Further, the diffractive structure provides the optical path difference with the light fluxes of respective wavelengths, which is defined by substituting the coefficients shown in the tables shown later into the expression 22. Meanwhile, the optical path difference providing structures of the present invention can be designed by the way other than the following expression (22) and can be expressed by the way other than the following expression (22).

$$\Phi(h) = \frac{\lambda}{\lambda_B} \times dor \times \sum_{i=0}^{6} C_{2i} h^{2i} \quad (22)$$

Hereupon, λ is the wavelength of the incident light flux, $\lambda_B$ is the design wavelength (blaze wavelength), dor is the diffraction order, $C_{2i}$ is the coefficient of the optical path difference function.

Figure 6:
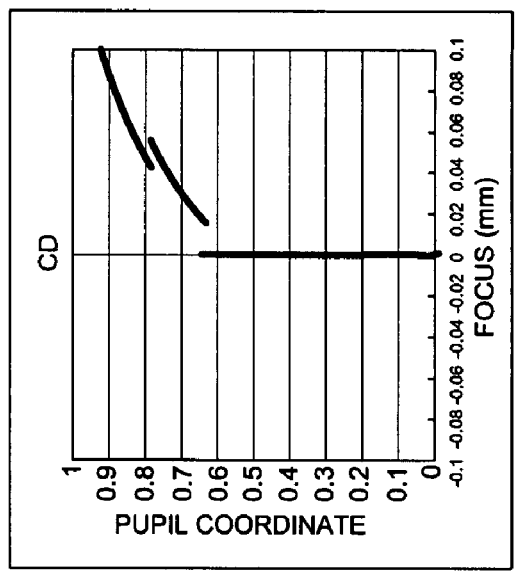
FIGS. 6(a)-6(c) are longitudinal spherical aberration diagrams relating respectively to BD, DVD and CD in Example 1 of the present invention.
Figure 6:
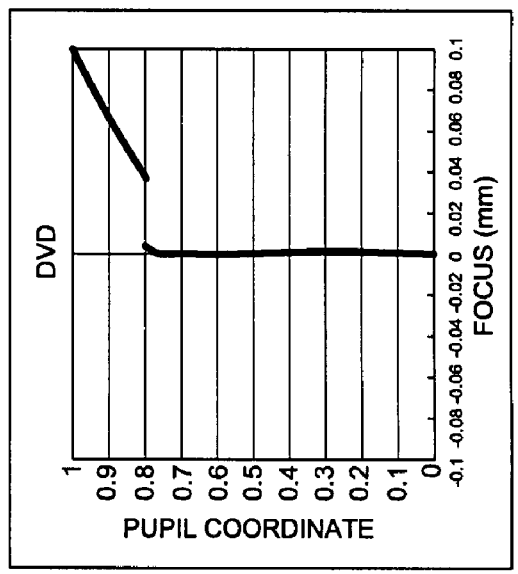
Figure 6:
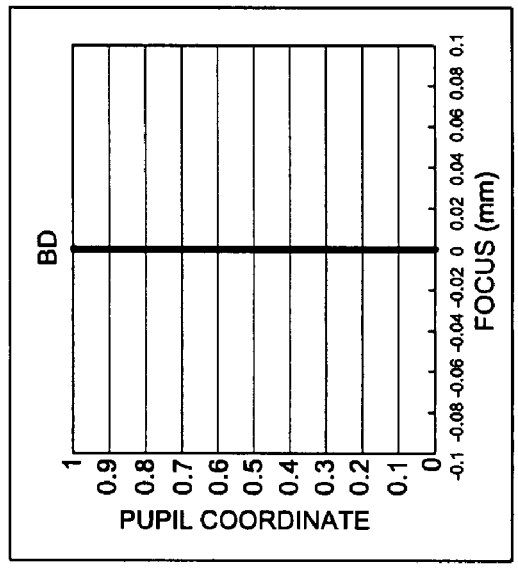

Each of FIGS. 6(a), 6(b) and 6(c) shows a vertical spherical aberration diagram in Example 1. The numeral 1.0 on the vertical axis in the vertical spherical aberration diagram represents NA 0.85 or the diameter of 3.74 mm. Incidentally, L=0.036 mm and f=2.311 mm hold in Example 1. Therefore, L/f=0.036/2.311=0.016 holds. Further, in Example 1, when a wavelength of a light flux for BD is changed by 5 nm, an amount of change of third order spherical aberration is −0.134 λrms, an amount of change of the fifth order spherical aberration is −0.031 λrms, an amount of change of the seventh order spherical aberration is −0.006 λrms, and an amount of change of the ninth order spherical aberration of is −0.001 λrms. Therefore, the total amount of change in the third—ninth orders spherical aberrations is 0.138 λrms. Further, in Example 1, when a wavelength of the light flux for BD is changed by 5 nm, and when a magnification of the fist light flux entering into the objective optical element is changed so that the third order spherical aberration may be 0, SA5 is −0.009 λrms, SA7 is 0.009 λrms, and SA9 is −0.003 λrms. Therefore, δSAH is 0.013 λrms and δSAH/δλ is 0.0026 (λrms/nm). Incidentally, a using wavelength is 408 nm and an ambient temperature in wavelength characteristics is 25° C.

As for the temperature characteristic of the objective optical element of Example 1, δSAT1 is +0.0035 WFE λrms/° C. Since the objective optical element for the first wavelength provides f'=2.2 mm, δSAT1/f' is +0.0016 WFE λrms/(° C.·mm).

TABLE 1

| Focal length of objective lens | $f_1$ = 2.20 mm | $f_2$ = 2.29 mm | $f_3$ = 2.31 mm |
|---|---|---|---|
| Numerical aperture | NA1: 0.85 | NA2: 0.66 | NA3: 0.51 |
| Magnification | m1: 0 | m2: 0 | m3: −1/32.8 |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | ∞ | | | | | 77.50 | |
| 1 (Aperture diameter) | ∞ | 0.0 (φ3.74 mm) | | 0.0 (φ2.94 mm) | | 0.0 (φ2.36 mm) | |
| 2 | 1.39667 | 2.510 | 1.5596 | 2.510 | 1.5406 | 2.510 | 1.5372 |
| 2-1 | 1.53466 | | | | | | |
| 2-2 | 1.53516 | | | | | | |
| 2-3 | 1.53572 | | | | | | |
| 2-4 | 1.53633 | | | | | | |
| 2-5 | 1.53453 | | | | | | |
| 2-6 | 1.53688 | | | | | | |
| 2-7 | 1.53753 | | | | | | |
| 2-8 | 1.53777 | | | | | | |
| 2-9 | 1.54148 | | | | | | |
| 2-10 | 1.50202 | | | | | | |
| 3 | −3.30470 | 0.76 | | 0.52 | | 0.23 | |
| 4 | ∞ | 0.0875 | 1.6196 | 0.600 | 1.5773 | 1.200 | 1.5709 |
| 5 | ∞ | | | | | | |

| | | Surface No. | | | | | |
|---|---|---|---|---|---|---|---|
| | | 2 | 2-1 | 2-2 | 2-3 | 2-4 | 2-5 |
| Area | | h ≦ 1.192 | 1.192 ≦ h ≦ 1.286 | 1.286 ≦ h ≦ 1.328 | 1.328 ≦ h ≦ 1.346 | 1.346 ≦ h ≦ 1.376 | 1.376 ≦ h ≦ 1.403 |
| Aspheric surface coefficient | κ | −8.10825E−01 | −6.18873E−01 | −6.23616E−01 | −6.26957E−01 | −6.30541E−01 | −6.41040E−01 |
| | A0 | 0.00000E+00 | 1.59456E−02 | 1.23373E−02 | 8.58605E−03 | 4.90522E−03 | 7.01584E−04 |
| | A4 | 1.15964E−02 | 1.66714E−02 | 1.66722E−02 | 1.66725E−02 | 1.66699E−02 | 1.66898E−02 |
| | A6 | 3.38965E−03 | 6.19009E−03 | 6.19009E−03 | 6.19009E−03 | 6.19009E−03 | 6.24994E−03 |
| | A8 | −1.16842E−03 | −2.24233E−03 | −2.24233E−03 | −2.24233E−03 | −2.24233E−03 | −2.24233E−03 |
| | A10 | 7.48879E−04 | 1.19717E−03 | 1.19717E−03 | 1.19717E−03 | 1.19717E−03 | 1.19717E−03 |
| | A12 | 6.53941E−05 | 3.88831E−04 | 3.88831E−04 | 3.88831E−04 | 3.88831E−04 | 3.88831E−04 |
| | A14 | −1.33307E−04 | −3.77956E−04 | −3.77956E−04 | −3.77956E−04 | −3.77956E−04 | −3.77956E−04 |
| | A16 | 6.35542E−06 | 8.63256E−05 | 8.63256E−05 | 8.63256E−05 | 8.63256E−05 | 8.63256E−05 |
| | A18 | 1.36161E−05 | 2.28631E−05 | 2.28631E−05 | 2.28631E−05 | 2.28631E−05 | 2.28631E−05 |
| | A20 | −2.44783E−06 | −8.07574E−06 | −8.07574E−06 | −8.07574E−06 | −8.07574E−06 | −8.07574E−06 |
| Optical path difference function | *1 | 1/1/1 | 2/1/1 | 2/1/1 | 2/1/1 | 2/1/1 | 2/1/1 |
| | *2 | 450 nm | 395 nm | 395 nm | 395 nm | 395 nm | 395 nm |
| | B2 | 4.81437E−03 | −8.14622E−03 | −8.14622E−03 | −8.14622E−03 | −8.14622E−03 | −8.14622E−03 |
| | B4 | −1.59162E−03 | 3.23575E−03 | 3.23575E−03 | 3.23575E−03 | 3.23575E−03 | 3.23575E−03 |
| | B6 | −4.05599E−04 | 6.74397E−04 | 6.74397E−04 | 6.74397E−04 | 6.74397E−04 | 6.74397E−04 |
| | B8 | 1.73369E−04 | −4.28831E−04 | −4.28831E−04 | −4.28831E−04 | −4.28831E−04 | −4.28831E−04 |
| | B10 | −8.10834E−05 | 1.62584E−04 | 1.62584E−04 | 1.62584E−04 | 1.62584E−04 | 1.62584E−04 |

| | | Surface No. | | | | | |
|---|---|---|---|---|---|---|---|
| | | 2-6 | 2-7 | 2-8 | 2-9 | 2-10 | 3 |
| Area | | 1.403 ≦ h ≦ 1.426 | 1.426 ≦ h ≦ 1.446 | 1.446 ≦ h ≦ 1.464 | 1.464 ≦ h ≦ 1.481 | 1.481 ≦ h | |
| Aspheric surface coefficient | κ | −6.39313E−01 | −6.39425E−01 | −6.56555E−01 | −6.37857E−01 | −7.24586E−01 | −5.17628E+01 |
| | A0 | −2.67730E−03 | −6.60398E−03 | −1.12205E−02 | −1.36156E−02 | 1.49058E−02 | 0.00000E+00 |
| | A4 | 1.66721E−02 | 1.66698E−02 | 1.74520E−02 | 1.64717E−02 | 2.08270E−02 | 9.68152E−02 |
| | A6 | 6.21640E−03 | 6.16708E−03 | 6.19009E−03 | 6.19009E−03 | 3.32455E−03 | −8.95429E−02 |
| | A8 | −2.24233E−03 | −2.24233E−03 | −2.24233E−03 | −2.24233E−03 | −2.60012E−03 | 6.48819E−02 |
| | A10 | 1.19717E−03 | 1.19717E−03 | 1.19717E−03 | 1.19717E−03 | 1.13789E−03 | −3.38259E−02 |
| | A12 | 3.88831E−04 | 3.88831E−04 | 3.88831E−04 | 3.88831E−04 | 1.17848E−06 | 9.83086E−03 |
| | A14 | −3.77956E−04 | −3.77956E−04 | −3.77956E−04 | −3.77956E−04 | −1.29800E−04 | −1.18919E−03 |
| | A16 | 8.63256E−05 | 8.63256E−05 | 8.63256E−05 | 8.63256E−05 | 8.13899E−06 | 0.00000E+00 |
| | A18 | 2.28631E−05 | 2.28631E−05 | 2.28631E−05 | 2.28631E−05 | 1.39700E−05 | 0.00000E+00 |
| | A20 | −8.07574E−06 | −8.07574E−06 | −8.07574E−06 | −8.07574E−06 | −2.69218E−06 | 0.00000E+00 |
| Optical path difference function | *1 | 2/1/1 | 2/1/1 | 2/1/1 | 2/1/1 | 5/3/2 | |
| | *2 | 395 nm | 395 nm | 395 nm | 395 nm | 408 nm | |
| | B2 | −8.14622E−03 | −8.14622E−03 | −8.14622E−03 | −8.14622E−03 | 5.52341E−04 | |
| | B4 | 3.23575E−03 | 3.23575E−03 | 3.23575E−03 | 3.23575E−03 | −1.68198E−04 | |
| | B6 | 6.74397E−04 | 6.74397E−04 | 6.74397E−04 | 6.74397E−04 | −5.21270E−04 | |
| | B8 | −4.28831E−04 | −4.28831E−04 | −4.28831E−04 | −4.28831E−04 | −1.11780E−05 | |
| | B10 | 1.62584E−04 | 1.62584E−04 | 1.62584E−04 | 1.62584E−04 | −6.62100E−06 | |

*1: Diffraction order number,
*2: Design wavelength

Example 2

Example 2 will be described as follows.

Figure 7:
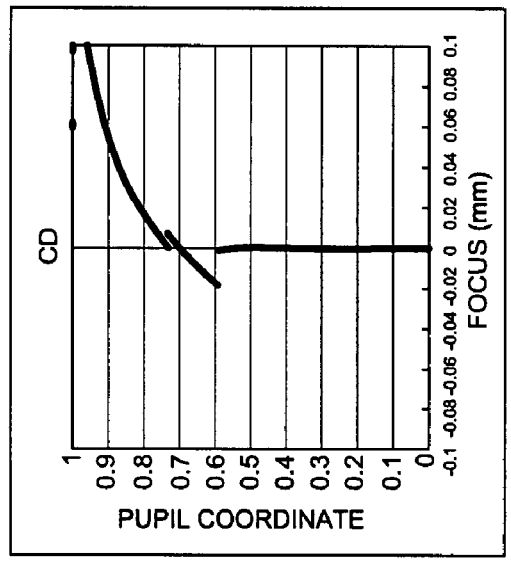
FIGS. 7(a)-7(c) are longitudinal spherical aberration diagrams relating respectively to BD, DVD and CD in Example 2 of the present invention.
Figure 7:
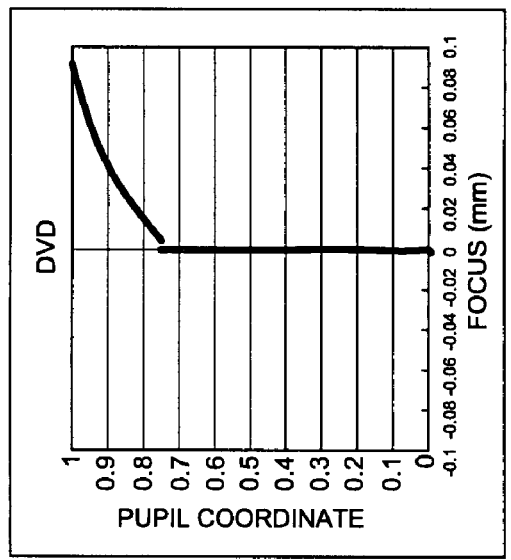
Figure 7:
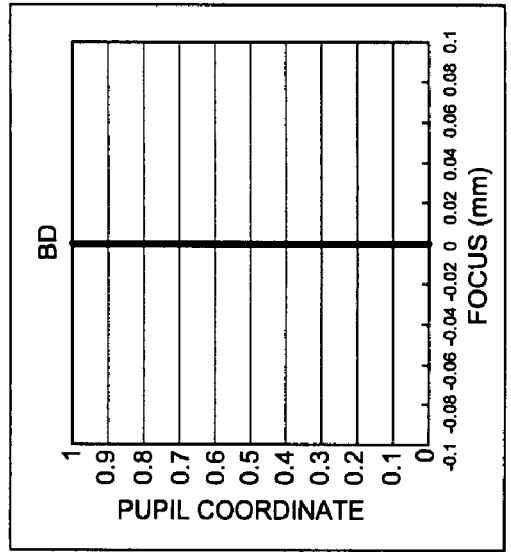

Lens data of Example 2 are shown in Table 2 below. Each of FIGS. 7(a), 7(b) and 7(c) shows a vertical spherical aberration diagram in Example 2. The numeral 1.0 on the vertical axis in the vertical spherical aberration diagram represents NA 0.85 or a diameter of 3.74 mm. Incidentally, L=0.098 mm and f=2.334 mm hold in Example 2. Therefore, L/f=0.098/2.334=0.042 holds. Further, in Example 2, when a wavelength of a light flux for BD is changed by 5 nm, an amount of change of the third order spherical aberration is −0.188 λrms, an amount of change of the fifth order spherical aberration is −0.021 λrms, an amount of change of the seventh order spherical aberration of is 0.030 λrms, and an amount of change of the ninth order spherical aberration is −0.016 λrms. Therefore, the total amount of change of the third to ninth order spherical aberrations of is 0.192 λrms. Further, in Example 2, when a wavelength of the light flux for BD is changed by 5 nm, and when a magnification of the first light flux entering to the objective optical element is changed so that the third order spherical aberration may be 0, SA5 is 0 λrms, SA7 is 0.037 λrms, and SA9 is −0.016 λrms. Therefore, δSAH is 0.042 λrms and δSAH/δλ is 0.0084 (λrms/nm). Incidentally, a using wavelength is 408 nm and an ambient temperature in wavelength characteristics is 25° C.

As for the temperature characteristic of the objective optical element of Example 2, δSAT1 is +0.0027 WFE λrms/° C. Since the objective optical element for the first wavelength provides f'=2.2 mm, δSAT1/f' is +0.0012 WFE λrms/(° C.·mm).

TABLE 2

| | | | | | | | |
|---|---|---|---|---|---|---|---|
| Focal length of objective lens | | $f_1$ = 2.20 mm | | $f_2$ = 2.30 mm | | $f_3$ = 2.33 mm | |
| Numerical aperture | | NA1: 0.85 | | NA2: 0.60 | | NA3: 0.45 | |
| Magnification | | m1: 0 | | m2: 0 | | m3: −1/32.4 | |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | ∞ | | | ∞ | | 77.53 | |
| 1 (Aperture diameter) | 0.0 | (φ3.74 mm) | | 0.0 (φ2.77 mm) | | 0.0 (φ2.14 mm) | |
| 2 | 1.38211 | 2.410 | 1.5596 | 2.410 | 1.5406 | 2.410 | 1.5372 |
| 2-1 | 1.51573 | | | | | | |
| 2-2 | 1.55322 | | | | | | |
| 2-3 | 1.51885 | | | | | | |
| 3 | −3.47437 | 0.82 | | 0.59 | | 0.32 | |
| 4 | ∞ | 0.0875 | 1.6196 | 0.600 | 1.5773 | 1.200 | 1.5709 |
| 5 | ∞ | | | | | | |

| | | Surface No. | | | | |
|---|---|---|---|---|---|---|
| | | 2 | 2-1 | 2-2 | 2-3 | 3 |
| Area | | h ≦ 1.100 | 1.100 ≦ h ≦ 1.145 | 1.145 ≦ h ≦ 1.396 | 1.396 ≦ h | |
| Aspheric surface coefficient | κ | −6.87288E−01 | −8.96269E−01 | −6.83136E−01 | −8.31168E−01 | −8.63596E+01 |
| | A0 | 0.00000E+00 | 4.68657E−02 | 5.49909E−02 | 3.32779E−02 | 0.00000E+00 |
| | A4 | 6.80300E−03 | 1.37464E−02 | 1.08627E−02 | 2.16417E−02 | 9.27005E−02 |
| | A6 | 2.19470E−03 | 7.35396E−03 | 7.34689E−03 | 3.53299E−03 | −9.72902E−02 |
| | A8 | 3.34295E−03 | −4.26399E−04 | −1.03974E−03 | 2.67295E−03 | 8.15465E−02 |
| | A10 | −4.13177E−03 | 1.22042E−03 | 1.22042E−03 | −1.77867E−03 | −4.46640E−02 |
| | A12 | 1.73984E−03 | 7.59120E−05 | 7.59120E−05 | 2.04005E−04 | 1.29730E−02 |
| | A14 | 2.03555E−04 | −3.91817E−04 | −3.91817E−04 | 2.41464E−04 | −1.53003E−03 |
| | A16 | −2.31775E−04 | 1.35143E−04 | 1.35143E−04 | −1.60198E−04 | 0.00000E+00 |
| | A18 | −7.16783E−06 | 9.18829E−06 | 9.18829E−06 | 4.73002E−05 | 0.00000E+00 |
| | A20 | 8.05067E−06 | −6.45098E−06 | −6.45098E−06 | −5.40077E−06 | 0.00000E+00 |
| Optical path difference function | *1 | 1/1/1 | 2/1/1 | 2/1/1 | 5/3/2 | |
| | *2 | 530 nm | 395 nm | 395 nm | 408 nm | |
| | B2 | 9.23389E−03 | −1.11443E−02 | −1.11443E−02 | 3.00373E−04 | |
| | B4 | −3.69887E−03 | 1.81188E−03 | 1.81188E−03 | −6.55813E−05 | |
| | B6 | 1.89068E−03 | 7.46626E−04 | 7.46626E−04 | −1.01929E−04 | |
| | B8 | −9.26170E−04 | −2.81739E−04 | −2.81739E−04 | 7.73763E−07 | |
| | B10 | 1.14464E−04 | 9.62982E−05 | 9.62982E−05 | −8.30189E−06 | |

*1: Diffraction order number,
*2: Design wavelength

Example 3

Example 3 will be described as follows. Example 3 differs from Example 1 in the point that the seventh basic structure is overlapped to a part (a region closer to the most peripheral area) of the peripheral area and a part (a region closer to the peripheral area) of the most peripheral area of the objective optical element in order to outreach the third light flux as a flare as far as possible. In other words, there can be given the second optical path difference providing structure whose inside area closer to an optical axis has the structure in which the second basic structure and the third basic structure are overlapped to each other, and whose outside area farther than the inside area from the optical axis has the structure in which the second basic structure, the third basic structure, and the seventh basic structure are overlapped to each other. Further there can be given the third optical path difference providing structure divided into an inner side area closer to an optical axis and an outer side area surrounding the inner side area, in which the inner side area is made of the structure wherein the seventh basic structure and the second basic structure are overlapped to each other, while the outer side area is made of the structure composed only of the second basic structure. In Example 3, the seventh basic structure, which is a binary structure, is designed to make a diffracted light amount of the zero-th order of the diffracted first light flux to be greater than a diffracted light amount of a diffracted first light flux with any other diffraction order number, then, to make a diffracted light amount of the zero-th order of the diffracted second light flux to be greater than a diffracted light amount of a diffracted second light flux with any other diffraction order number and to make a diffracted light amount of the ±first order of the diffracted third light flux to be greater than a diffracted light amount of a diffracted third light flux with any other diffraction order number (including also zero-th order, namely, transmitted light).

Figure 8:
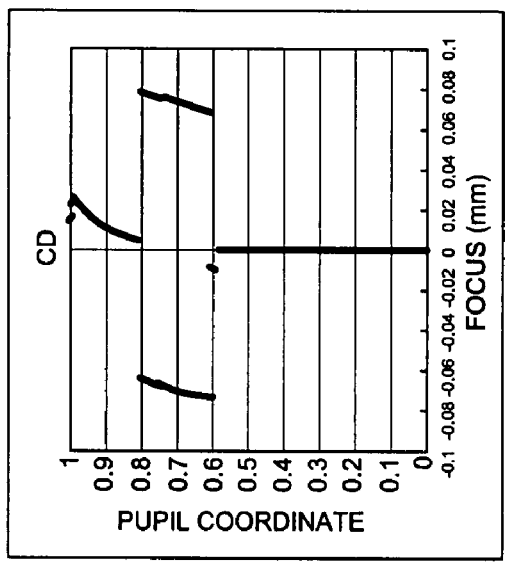
FIGS. 8(a)-8(c) are longitudinal spherical aberration diagrams relating respectively to BD, DVD and CD in Example 3 of the present invention.
Figure 8:
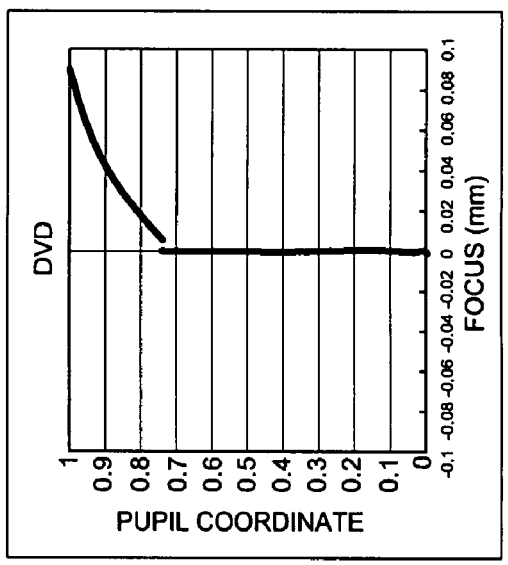
Figure 8:
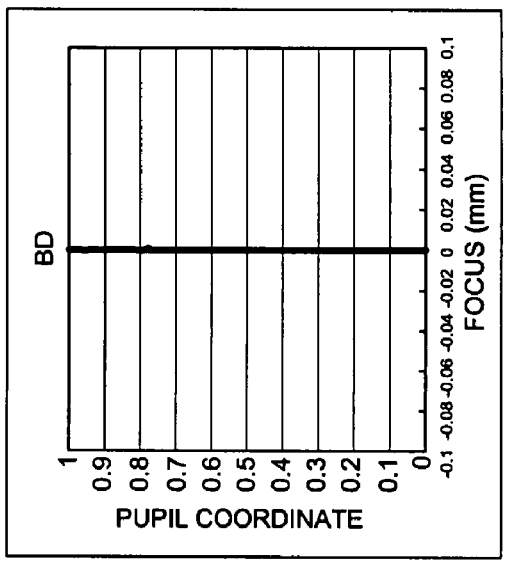

Lens data of Example 3 are shown in Table 3 below. Each of FIGS. 8(a), 8(b) and 8(c) shows a vertical spherical aberration diagram in Example 3. The numeral 1.0 on the vertical axis in the vertical spherical aberration diagram represents NA 0.85 or a diameter of 3.74 mm. Incidentally, L=0.098 mm and f=2.334 mm hold in Example 3. Therefore, L/f=0.098/2.334=0.042 holds. Further, in Example 3, when a wavelength of a light flux for BD is changed by 5 nm, an amount of change of the third order spherical aberration is −0.188 λrms, an amount of change of the fifth order spherical aberration is −0.021 λrms, an amount of change of the seventh order spherical aberration of is 0.030 λrms, and an amount of change of the ninth order spherical aberration is −0.016 λrms. Therefore, the total amount of change of the third—ninth order spherical aberrations of is 0.192 λrms. Further, in Example 3, when a wavelength of the light flux for BD is changed by 5 nm, and when a magnification of the first light flux entering to the objective optical element is changed so that the third order spherical aberration may be 0, SA5 is 0 λrms, SA7 is 0.037 λrms, and SA9 is −0.016 λrms. Therefore, δSAH is 0.042 λrms and δSAH/δλ is 0.0084 (λrms/nm). Incidentally, a using wavelength is 408 nm and an ambient temperature in wavelength characteristics is 25° C.

As for temperature characteristic of the objective optical element of the Example 3, δSAT1 is +0.0027 WFE λrms/° C. Since the objective optical element for the first wavelength provides f'=2.2 mm, δSAT1/f' is +0.0012 WFE λrms/(° C.·mm).

TABLE 3

| Focal length of objective lens | | $f_1$ = 2.20 mm | | $f_2$ = 2.30 mm | | $f_3$ = 2.33 mm | |
|---|---|---|---|---|---|---|---|
| Numerical aperture | | NA1: 0.85 | | NA2: 0.60 | | NA3: 0.45 | |
| Magnification | | m1: 0 | | m2: 0 | | m3: −1/32.4 | |

| $i^{th}$ surface | | ri | di (408 nm) | ni (408 nm) | di (658 nm) | ni (658 nm) | di (785 nm) | ni (785 nm) |
|---|---|---|---|---|---|---|---|---|
| 0 | | | ∞ | | ∞ | | 77.53 | |
| 1 (Aperture diameter) | | | 0.0 (φ3.74 mm) | | 0.0 (φ2.77 mm) | | 0.0 (φ2.14 mm) | |
| 2 | | 1.38211 | 2.410 | 1.5596 | 2.410 | 1.5406 | 2.410 | 1.5372 |
| 2-1 | | 1.51573 | | | | | | |
| 2-2 | | 1.55322 | | | | | | |
| 2-3 | | 1.51885 | | | | | | |
| 2-4 | | 1.51885 | | | | | | |
| 3 | | −3.47437 | 0.82 | | 0.59 | | 0.32 | |
| 4 | | ∞ | 0.0875 | 1.6196 | 0.600 | 1.5773 | 1.200 | 1.5709 |
| 5 | | ∞ | | | | | | |

| | | Surface No. | | | | | |
|---|---|---|---|---|---|---|---|
| | | 2 | 2-1 | 2-2 | 2-3 | 2-4 | 3 |
| Area | | h ≤ 1.100 | 1.100 ≤ h ≤ 1.145 | 1.145 ≤ h ≤ 1.396 | 1.396 ≤ h ≤ 1.530 | 1.530 ≤ h | |
| Aspheric surface coefficient | κ | −6.87288E−01 | −8.96269E−01 | −6.83136E−01 | −8.31168E−01 | −8.31168E−01 | −8.63596E+01 |
| | A0 | 0.00000E+00 | 4.68657E−02 | 5.49909E−02 | 3.32779E−02 | 3.32779E−02 | 0.00000E+00 |
| | A4 | 6.80300E−03 | 1.37464E−02 | 1.08627E−02 | 2.16417E−02 | 2.16417E−02 | 9.27005E−02 |
| | A6 | 2.19470E−03 | 7.35396E−03 | 7.34689E−03 | 3.53299E−03 | 3.53299E−03 | −9.72902E−02 |
| | A8 | 3.34295E−03 | −4.26399E−04 | −1.03974E−03 | 2.67295E−03 | 2.67295E−03 | 8.15465E−02 |
| | A10 | −4.13177E−03 | 1.22042E−03 | 1.22042E−03 | −1.77867E−03 | −1.77867E−03 | −4.46640E−02 |
| | A12 | 1.73984E−03 | 7.59120E−05 | 7.59120E−05 | 2.04005E−04 | 2.04005E−04 | 1.29730E−02 |
| | A14 | 2.03555E−04 | −3.91817E−04 | −3.91817E−04 | 2.41464E−04 | 2.41464E−04 | −1.53003E−03 |
| | A16 | −2.31775E−04 | 1.35143E−04 | 1.35143E−04 | −1.60198E−04 | −1.60198E−04 | 0.00000E+00 |
| | A18 | −7.16783E−06 | 9.18829E−06 | 9.18829E−06 | 4.73002E−05 | 4.73002E−05 | 0.00000E+00 |
| | A20 | 8.05067E−06 | −6.45098E−06 | −6.45098E−06 | −5.40077E−06 | −5.40077E−06 | 0.00000E+00 |
| Optical path difference function 1 | *1 | 1/1/1 | 2/1/1 | 2/1/1 | 5/3/2 | 5/3/2 | |
| | *2 | 530 nm | 395 nm | 395 nm | 408 nm | 408 nm | |
| | B2 | 9.23389E−03 | −1.11443E−02 | −1.11443E−02 | 3.00373E−04 | 3.00373E−04 | |
| | B4 | −3.69887E−03 | 1.81188E−03 | 1.81188E−03 | −6.55813E−05 | −6.55813E−05 | |
| | B6 | 1.89068E−03 | 7.46626E−04 | 7.46626E−04 | −1.01929E−04 | −1.01929E−04 | |
| | B8 | −9.26170E−04 | −2.81739E−04 | −2.81739E−04 | 7.73763E−07 | 7.73763E−07 | |
| | B10 | 1.14464E−04 | 9.62982E−05 | 9.62982E−05 | −8.30189E−06 | −8.30189E−06 | |
| Optical path difference function 2 | *1 | | | 0/0/1 or −1 | 0/0/1 or −1 | | |
| | *2 | | | 785 nm | 785 nm | | |
| | B2 | | | 1.60000E−02 | 1.60000E−02 | | |
| | B4 | | | 1.00000E−03 | 1.00000E−03 | | |
| | B6 | | | 5.00000E−04 | 5.00000E−04 | | |
| | B8 | | | 0.00000E+00 | 0.00000E+00 | | |
| | B10 | | | 0.00000E+00 | 0.00000E+00 | | |

*1: Diffraction order number,
*2: Design wavelength

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical pickup apparatus for recording and/or reproducing information for an optical disk, the optical pickup apparatus comprising:

a first light source for emitting a first light flux having a first wavelength $\lambda 1$;

a second light source for emitting a second light flux having a second wavelength $\lambda 2$ ($\lambda 2 > \lambda 1$);

a third light source for emitting a third light flux having a third wavelength $\lambda 3$ ($\lambda 3 > \lambda 2$); and an objective optical element for converging the first light flux onto an information recording surface of a first optical disk having a protective substrate with a thickness t1, for converging the second light flux onto an information recording surface of a second optical disk having a protective substrate with a thickness t2 (t1≦t2), and for converging the third light flux onto an information recording surface of a third optical disk having a protective substrate with a thickness t3 (t2<t3), wherein the optical pickup apparatus records and/or reproduces information by converging the first light flux onto the information recording surface of the first optical disk, by converging the second light flux onto the information recording surface of the second optical disk, and by converging the third light flux onto the information recording surface of the third optical disk, wherein the objective optical element comprises an optical surface comprising a central area and a peripheral area surrounding the central area, the central area comprises a first optical path difference providing structure, and the peripheral area comprises a second optical path difference providing structure, wherein the objective optical element converges the first light flux which passes through the central area of the objective optical element onto the information recording surface of the first optical disk so that the optical pickup apparatus can record and/or reproduce information on the information recording surface of the first optical disk, the objective optical element converges the second light flux which passes through the central area of the objective optical element onto the information recording surface of the second optical disk so that the optical pickup apparatus can record and/or reproduce information on the information recording surface of the second optical disk, the objective optical element converges the third light flux which passes through the central area of the objective optical element onto the information recording surface of the third optical disk so that the optical pickup apparatus can record and/or reproduce information on the information recording surface of the third optical disk, the objective optical element converges the first light flux which passes through the peripheral area of the objective optical element onto the information recording surface of the first optical disk so that the optical pickup apparatus can record and/or reproduce information on the information recording surface of the first optical disk, and the objective optical element converges the second light flux which passes through the peripheral area of the objective optical element onto the information recording surface of the second optical disk so that the optical pickup apparatus can record and/or reproduce information on the information recording surface of the second optical disk, wherein the third light flux which passes through the first optical path difference providing structure forms a first best focus in which the third light flux forms a spot having a smallest diameter, the third light flux which passes through the first optical path difference providing structure forms a second best focus in which the third light flux forms a spot having a second smallest diameter, and the first best focus and the second best focus satisfy a following expression:

$$0 < L/f < 0.05,$$

where f (mm) is a focal length of the objective optical element for the third light flux which passes through the first optical path difference structure and forms the first best focus, and L (mm) is a distance between the first best focus and the second best focus, wherein the third light flux which passes through the objective optical element forms a spot on the information recording surface of the third optical disk, and the spot comprises, in order from a center to an outside of the spot when viewing the spot from a direction of an optical axis of the objective optical element:

a central spot portion having a highest light density;

an intermediate spot portion having a lower light density than the central spot portion; and a peripheral spot portion having a higher light density than the intermediate spot portion and having a lower light density than the central spot portion, wherein the central spot portion is used for recording and/or reproducing information for the third optical disk, and the intermediate spot portion and the peripheral spot portion are not used for recording and/or reproducing information for the third optical disk, and wherein the peripheral spot portion is formed on the information recording surface of the third optical disk by the third light flux which passes through the second optical path difference providing structure of the objective optical element.

2. The optical pickup apparatus of claim 1, satisfying following expressions:

$$\delta SAH/\delta\lambda \leq 0.010\ (\lambda rms/nm),$$

and $$\delta SAH = \sqrt{((\delta SA5)^2 + (\delta SA7)^2 + (\delta SA9)^2)},$$

where $\delta SA5$ is a fifth order spherical aberration generated when information is recorded and/or reproduced for the first optical disk using a light flux with a wavelength $\lambda x$ which is shifted from a using wavelength of 408 nm at a magnification making a third order spherical aberration SA3 zero, the magnification being the magnification of the light flux with the wavelength of $\lambda x$ for the objective optical element, $\delta SA7$ is a seventh order spherical aberration generated when information is recorded and/or reproduced for the first optical disk using a light flux with the wavelength $\lambda x$ at a magnification making a third order spherical aberration SA3 zero, the magnification being the magnification of the light flux with the wavelength of λx for the objective optical element, δSA9 is a ninth order spherical aberration generated when information is recorded and/or reproduced for the first optical disk using a light flux with the wavelength λx at a magnification making a third order spherical aberration SA3 zero, the magnification being the magnification of the light flux with the wavelength of λx for the objective optical element, and δλ is an absolute value of a difference between 408 nm and λx nm.

3. The optical pickup apparatus of claim 1,
wherein according to a graph whose horizontal axis represents a distance from an optical axis in a direction perpendicular to the optical axis of the objective optical element, and whose vertical axis represents an optical path difference of the first light flux provided by the objective optical element when the first light flux passes through the objective optical element, and the graph comprises a discontinuity at a wavelength which is shifted by 5 nm from a designed wavelength of the first wavelength of the objective optical element, and a gap width of the optical path difference at the discontinuity is 0 or more, and 0.2 λ1 or less.

4. The optical pickup apparatus of claim 1, satisfying $$\eta 13 \geq 40\%,$$

where η13 is an efficiency of a light utilization of the third light flux on the central area.

5. The optical pickup apparatus of claim 1,
wherein the spot formed by the third light flux in the first best focus is used for recording and/or reproducing information for the third optical disk, and the spot formed by the third light flux in the second best focus is not used for recording and/or reproducing information for the third optical disk.

6. The optical pickup apparatus of claim 1,
wherein the optical surface of the objective optical element further comprises a most peripheral area surrounding the peripheral area and being a refractive surface.

7. The optical pickup apparatus of claim 1,
wherein the optical surface of the objective optical element further comprises a most peripheral area surrounding the peripheral area and comprising a third optical path difference providing structure.

8. The optical pickup apparatus of claim 6,
wherein the objective optical element converges the first light flux passing through the most peripheral area of the objective optical element onto the information recording surface of the first optical disk so that the optical pickup apparatus can record and/or reproduce information for the first optical disk.

9. The optical pickup apparatus of claim 7,
wherein the objective optical element converges the first light flux passing through the most peripheral area of the objective optical element onto the information recording surface of the first optical disk so that the optical pickup apparatus can record and/or reproduce information for the first optical disk.

10. The optical pickup apparatus of claim 1,
wherein the first optical path difference providing structure corrects a spherical aberration for the first light flux and the second light flux each passing through the first optical path difference providing structure, the spherical aberration being caused by a difference between the thickness t1 of the protective substrate of the first optical disk and the thickness t2 of the protective substrate of the second optical disk.

11. The optical pickup apparatus of claim 1,
wherein the first optical path difference providing structure corrects a spherical aberration for the first light flux and the third light flux each passing through the first optical path difference providing structure, the spherical aberration being caused by a difference between the thickness t1 of the protective substrate of the first optical disk and the thickness t3 of the protective substrate of the third optical disk.

12. The optical pickup apparatus of claim 1,
wherein the second optical path difference providing structure corrects a spherical aberration for the first light flux and the second light flux each passing through the second optical path difference providing structure, the spherical aberration being caused by a difference between the thickness t1 of the protective substrate of the first optical disk and the thickness t2 of the protective substrate of the second optical disk.

13. The optical pickup apparatus of claim 1,
wherein the second optical path difference providing structure corrects a spherochromatism or a spherical aberration for the first light flux and the second light flux each passing through the second optical path difference providing structure, the spherochromatism being caused by a slight fluctuation of the wavelength of the first light flux or the second light flux, the spherical aberration being caused by a temperature change in the objective optical element.

14. The optical pickup apparatus of claim 1, satisfying following expressions:

$$-0.02 < m1 < 0.02,$$

and $$-0.02 < m2 < 0.02,$$

where m1 is a magnification of the first light flux entering into the objective optical element, and m2 is a magnification of the second light flux entering into the objective optical element.

15. The optical pickup apparatus of claim 14, further satisfying a following expression:

$$-0.02 < m3 < 0.02,$$

where m3 is a magnification of the third light flux entering into the objective optical element.

16. The optical pickup apparatus of claim 14, further satisfying a following expression:

$$-0.10 < m3 < 0.00$$

where m3 is a magnification of the third light flux entering into the objective optical element.

17. The optical pickup apparatus of claim 1,
wherein the objective optical element is a single lens.

18. The optical pickup apparatus of claim 1, further comprising an opening limiting element arranged between the objective optical element and the first light source, between the objective optical element and the second light source, and between the objective optical element and the third light source in a common optical path of the first, second, and third light fluxes, wherein the opening limiting element comprises a first area closest to an optical axis, and a second area arranged farther position from the optical axis than the first area, the first area transmits the first light flux, the second light flux, and the third light flux, the second area transmits the first light flux and the second light flux and does not converge the third light flux at a light converging position of the third light flux which passes through the first area of the opening limiting element and the objective optical element, and the third light flux which passes through the first area enters into the central area of the objective optical element.

19. The optical pickup apparatus of claim 18, further comprising a λ/4 wavelength plate,
wherein the opening limiting element is integrally formed in one body with the λ/4 wavelength plate.

20. The optical pickup apparatus of claim 18, satisfying $0.02 \leq L/f < 0.05$.

21. An objective optical element for use in an optical pickup apparatus, the optical pickup apparatus comprising:
a first light source for emitting a first light flux having a first wavelength λ1;
a second light source for emitting a second light flux having a second wavelength λ2 (λ2>λ1); and
a third light source for emitting a third light flux having a third wavelength λ3 (λ3>λ2), and
conducting recording and/or reproducing information using the first light flux for a first optical disk having a protective substrate with a thickness t1,
conducting recording and/or reproducing information using the second light flux for a second optical disk having a protective substrate with a thickness t2 (t1≦t2), and
conducting recording and/or reproducing information using the third light flux for a third optical disk having a protective substrate with a thickness t3 (t2<t3),
the objective optical element comprising:
an optical surface comprising a central area and a peripheral area surrounding the central area,
wherein the central area comprises a first optical path difference providing structure,
the peripheral area comprises a second optical path difference providing structure,
wherein the objective optical element converges the first light flux which passes through the central area of the objective optical element onto the information recording surface of the first optical disk so that the optical pickup apparatus can record and/or reproduce information on the information recording surface of the first optical disk,
the objective optical element converges the second light flux which passes through the central area of the objective optical element onto the information recording surface of the second optical disk so that the optical pickup apparatus can record and/or reproduce information on the information recording surface of the second optical disk,
the objective optical element converges the third light flux which passes through the central area of the objective optical element onto the information recording surface of the third optical disk so that the optical pickup apparatus can record and/or reproduce information on the information recording surface of the third optical disk,
the objective optical element converges the first light flux which passes through the peripheral area of the objective optical element onto the information recording surface of the first optical disk so that the optical pickup apparatus can record and/or reproduce information on the information recording surface of the first optical disk, and the objective optical element converges the second light flux which passes through the peripheral area of the objective optical element onto the information recording surface of the second optical disk so that the optical pickup apparatus can record and/or reproduce information on the information recording surface of the second optical disk, wherein the third light flux which has passed through the first optical path difference providing structure forms a first best focus in which the third light flux forms a spot having a smallest diameter, the third light flux which passes through the first optical path difference providing structure forms a second best focus in which the third light flux forms a spot having a second smallest diameter, and the first best focus and the second best focus satisfy a following expression:

$0 < L/f < 0.05$, where f (mm) is a focal length of the objective optical element for the third light flux which passes through the first optical path difference structure and forms the first best focus, and L (mm) is a distance between the first best focus and the second best focus, wherein the third light flux which passes through the objective optical element forms a spot on the information recording surface of the third optical disk, and the spot comprises, in order from a center to an outside of the spot when viewing the spot from a direction of an optical axis of the objective optical element:
a central spot portion having a highest light density;
an intermediate spot portion having a lower light density than the central spot portion; and
a peripheral spot portion having a higher light density than the intermediate spot portion and having a lower light density than the central spot portion, wherein the central spot portion is used for recording and/or reproducing information for the third optical disk, and the intermediate spot portion and the peripheral spot portion are not used for recording and/or reproducing information for the third optical disk, and wherein the peripheral spot portion is formed on the information recording surface of the third optical disk by the third light flux which has passed through the second optical path difference providing structure of the objective optical element.

22. The objective optical element of claim 21, satisfying following expressions:

$\delta SAH/\delta\lambda \leq 0.010$ (λrms/nm), and $\delta SAH = \sqrt{((\delta SA5)^2 + (\delta SA7)^2 + (\delta SA9)^2)}$, where δSA5 is a fifth order spherical aberration generated when information is recorded and/or reproduced for the first optical disk using a light flux with a wavelength λx which is shifted from a using wavelength of 408 nm at a magnification making a third order spherical aberration SA3 zero, the magnification being the magnification of the light flux with the wavelength of λx for the objective optical element, δSA7 is a seventh order spherical aberration generated when information is recorded and/or reproduced for the first optical disk using a light flux with the wavelength λx at a magnification making a third order spherical aberration SA3 zero, the magnification being the magnification of the light flux with the wavelength of λx for the objective optical element, δSA9 is a ninth order spherical aberration generated when information is recorded and/or reproduced for the first optical disk using a light flux with the wavelength λx at a magnification making a third order spherical aberration SA3 zero, the magnification being the magnification of the light flux with the wavelength of λx for the objective optical element, and δλ is an absolute value of a difference between 408 nm and λx nm.

23. The objective optical element of claim 21,
wherein the optical pickup apparatus provides a graph whose horizontal axis represents a distance from an optical axis in a direction of a radius of the objective optical element, and whose vertical axis represents an optical path difference of the first light flux provided by the objective optical element when the first light flux passes through the objective optical element, and
the graph comprises a discontinuity at a wavelength which is shifted by 5 nm from a designed wavelength of the first wavelength of the objective optical element, and
a gap width of the optical path difference at the discontinuity is 0 or more, and 0.2 λ1 or less.

24. The objective optical element of claim 21, satisfying

η13≧40%, where η13 is an efficiency of a light utilization of the third light flux on the central area.

25. The objective optical element of claim 21,
wherein the spot formed by the third light flux in the first best focus is used for recording and/or reproducing information for the third optical disk, and
the spot formed by the third light flux in the second best focus is not used for recording and/or reproducing information for the third optical disk.

26. The objective optical element of claim 21,
wherein the optical surface of the objective optical element further comprises a most peripheral area surrounding the peripheral area and being a refractive surface.

27. The objective optical element of claim 21,
wherein the optical surface of the objective optical element further comprises a most peripheral area surrounding the peripheral area and comprising a third optical path difference providing structure.

28. The objective optical element of claim 26,
wherein the objective optical element converges the first light flux passing through the most peripheral area of the objective optical element onto the information recording surface of the first optical disk so that the optical pickup apparatus can record and/or reproduce information for the first optical disk.

29. The objective optical element of claim 27,
wherein the objective optical element converges the first light flux passing through the most peripheral area of the objective optical element onto the information recording surface of the first optical disk so that the optical pickup apparatus can record and/or reproduce information for the first optical disk.

30. The objective optical element of claim 21,
wherein the first optical path difference providing structure corrects a spherical aberration for the first light flux and the second light flux each passing through the first optical path difference providing structure, the spherical aberration being caused by a difference between the thickness t1 of the protective substrate of the first optical disk and the thickness t2 of the protective substrate of the second optical disk.

31. The objective optical element of claim 21,
wherein the first optical path difference providing structure corrects a spherical aberration for the first light flux and the third light flux each passing through the first optical path difference providing structure, the spherical aberration being caused by a difference between the thickness t1 of the protective substrate of the first optical disk and the thickness t3 of the protective substrate of the third optical disk.

32. The objective optical element of claim 21,
wherein the second optical path difference providing structure corrects a spherical aberration for the first light flux and the second light flux each passing through the second optical path difference providing structure, the spherical aberration being caused by a difference between the thickness t1 of the protective substrate of the first optical disk and the thickness t2 of the protective substrate of the second optical disk.

33. The objective optical element of claim 21,
wherein the second optical path difference providing structure corrects a spherochromatism for the first light flux and the second light flux each passing through the second optical path difference providing structure, the spherochromatism being caused by a slight fluctuation of the wavelength of the first light flux or the second light flux, the spherical aberration being caused by a temperature change in the objective optical element.

34. The objective optical element of claim 21,
wherein the objective optical element is a single lens.

35. An optical information recording and/or reproducing apparatus, comprising:
an optical pickup apparatus comprising:
a first light source for emitting a first light flux having a first wavelength λ1;
a second light source for emitting a second light flux having a second wavelength λ2 (λ2>λ1);
a third light source for emitting a third light flux having a third wavelength λ3 (λ3>λ2); and
an objective optical element
converging the first light flux onto an information recording surface of a first optical disk having a protective substrate with a thickness t1,
for converging the second light flux onto an information recording surface of a second optical disk having a protective substrate with a thickness t2 (t1≦t2), and
for converging the third light flux onto an information recording surface of a third optical disk having a protective substrate with a thickness t3 (t2<t3),
wherein the optical pickup apparatus records and/or reproduces information by converging the first light flux onto the information recording surface of the first optical disk, by converging the second light flux onto the information recording surface of the second optical disk, and by converging the third light flux onto the information recording surface of the third optical disk,
wherein the objective optical element comprises an optical surface comprising a central area and a peripheral area surrounding the central area,
the central area comprises a first optical path difference providing structure, and the peripheral area comprises a second optical path difference providing structure, wherein the objective optical element converges the first light flux which passes through the central area of the objective optical element onto the information recording surface of the first optical disk so that the optical pickup apparatus can record and/or reproduce information on the information recording surface of the first optical disk, the objective optical element converges the second light flux which passes through the central area of the objective optical element onto the information recording surface of the second optical disk so that the optical pickup apparatus can record and/or reproduce information on the information recording surface of the second optical disk, the objective optical element converges the third light flux which passes through the central area of the objective optical element onto the information recording surface of the third optical disk so that the optical pickup apparatus can record and/or reproduce information on the information recording surface of the third optical disk, the objective optical element converges the first light flux which passes through the peripheral area of the objective optical element onto the information recording surface of the first optical disk so that the optical pickup apparatus can record and/or reproduce information on the information recording surface of the first optical disk, and the objective optical element converges the second light flux which passes through the peripheral area of the objective optical element onto the information recording surface of the second optical disk so that the optical pickup apparatus can record and/or reproduce information on the information recording surface of the second optical disk, wherein the third light flux which passes through the first optical path difference providing structure forms a first best focus in which the third light flux forms a spot having a smallest diameter, the third light flux which passes through the first optical path difference providing structure forms a second best focus in which the third light flux forms a spot having a second smallest diameter, and the first best focus and the second best focus satisfy a following expression:

$$0 < L/f < 0.05,$$

where f (mm) is a focal length of the objective optical element for the third light flux which passes through the first optical path difference structure and forms the first best focus, and L (mm) is a distance between the first best focus and the second best focus, wherein the third light flux which passes through the objective optical element forms a spot on the information recording surface of the third optical disk, and the spot comprises, in order from a center to an outside of the spot when viewing the spot from a direction of an optical axis of the objective optical element:

a central spot portion having a highest light density;

an intermediate spot portion having a lower light density than the central spot portion; and a peripheral spot portion having a higher light density than the intermediate spot portion and having a lower light density than the central spot portion, and wherein the central spot portion is used for recording and/or reproducing information for the third optical disk, and the intermediate spot portion and the peripheral spot portion are not used for recording and/or reproducing information for the third optical disk, and wherein the peripheral spot portion is formed on the information recording surface of the third optical disk by the third light flux which passes through the second optical path difference providing structure of the objective optical element.

* * * * *